United States Patent [19]

Buma et al.

[11] Patent Number: 4,693,494

[45] Date of Patent: Sep. 15, 1987

[54] SUSPENSION CONTROLLER

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Toyota, Japan

[21] Appl. No.: 914,736

[22] Filed: Oct. 1, 1986

[30] Foreign Application Priority Data

Oct. 1, 1985 [JP] Japan ................................ 60-219687

[51] Int. Cl.$^4$ ................................................ B60G 9/00
[52] U.S. Cl. ..................................... 280/707; 364/424
[58] Field of Search ............... 280/6 R, 6.1, 6 H, 707, 280/689, 772; 180/41; 364/424

[56] References Cited

U.S. PATENT DOCUMENTS

| 4,468,739 | 8/1984 | Woods et al. ........................ 280/714 |
| 4,589,676 | 5/1986 | Meloche et al. ..................... 280/714 |
| 4,639,014 | 1/1987 | Tanaka et al. ...................... 280/6 H |

FOREIGN PATENT DOCUMENTS 59-23712  2/1984  Japan .

Primary Examiner—John J. Love
Assistant Examiner—Ross Weaver
Attorney, Agent, or Firm—Oblon, Fisher, Spivak, McClelland & Maier

[57] ABSTRACT

A suspension controller for improving the riding comfort, particularly for preventing bumping of bound stoppers or rebound stoppers against the vehicle body includes: a vehicle height detection means for detecting a vehicle height at a front wheel and for generating a vehicle height signal according to the distance; a conversion means for converting the detected vehicle height signal into a corresponding converted height signal, wherein the converted height signal increases more sharply than the actual vehicle height signal when the actual vehicle height signal is greater then a preset value and decreases sharply when the vehicle height signal is less than another preset value; a control means for generating a suspension characteristic alteration signal depending on the converted height signal; and a suspension characteristic alteration means for altering characteristics of suspensions of the vehicle in response to the suspension characteristic alteration signal.

10 Claims, 31 Drawing Figures

FIG.8

| CONVERTED HEIGHT Hm | VEHICLE HEIGHT | POSITION OF WHEELS |
|---|---|---|
| | | — FULL REBOUND |
| 26 | 16 | |
| 22 | 15 | |
| 19 | 14 | |
| 18 | 13 | — HIGH |
| 17 | 12 | |
| 16 | 11 | |
| 15 | 10 | |
| 14 | 9 | — NORMAL |
| 13 | 8 | |
| 12 | 7 | |
| 11 | 6 | |
| 10 | 5 | — LOW |
| 9 | 4 | |
| 8 | 3 | |
| 5 | 2 | |
| 1 | 1 | |
| | | — FULL BOUND |

FIG.10

| FIRST CONVERTED VALUE Hm | VEHICLE HEIGHT | SECOND CONVERTED VALUE Hm | POSITION OF WHEELS |
|---|---|---|---|
|  |  |  | FULL REBOUND |
| 26 | 26 | 26 |  |
|  | 25 | 25 |  |
|  | 24 | 24 |  |
|  | 23 | 23 |  |
| 22 | 22 | 22 |  |
|  | 21 | 21 |  |
|  | 20 | 20 |  |
| 19 | 19 | 19 |  |
| 18 | 18 | 18 | HIGH |
| 17 | 17 | 17 |  |
| 16 | 16 | 16 |  |
| 15 | 15 | 15 |  |
| 14 | 14 | 14 | NORMAL |
| 13 | 13 | 13 |  |
| 12 | 12 | 12 |  |
| 11 | 11 | 11 |  |
| 10 | 10 | 10 | LOW |
| 9 | 9 | 9 |  |
| 8 | 8 | 8 |  |
| 5 | 7 | 7 |  |
|  | 6 | 6 |  |
|  | 5 | 5 |  |
| 1 | 4 | 4 |  |
|  | 3 | 3 |  |
|  | 2 | 2 |  |
|  | 1 | 1 | FULL BOUND |

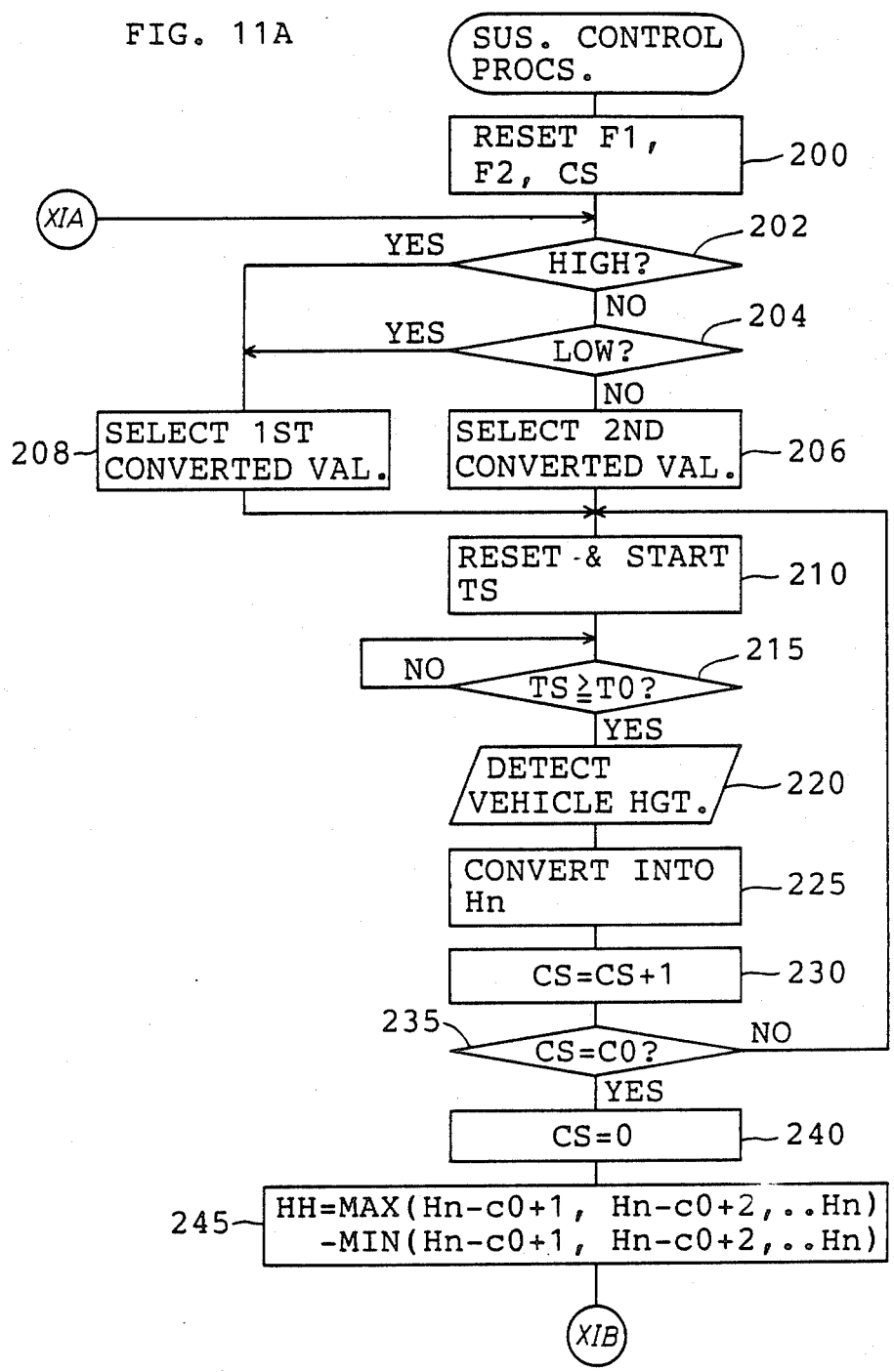

SUSPENSION CONTROLLER

BACKGROUND OF THE INVENTION

1. Field of the Invention

This invention relates to a suspension controller for improving riding comfort when a vehicle is running on a rough road.

2. Description of the Prior Art

By altering suspension characteristics or a vehicle height in accordance with the condition of a road surface or the attitude of a running vehicle, various suspension controllers for improving riding comfort, controllability and stability of the vehicle have thus far been developed. For example, a suspension controller has been proposed in Japanese Published Unexamined Patent Application No. Sho 59-23712. In such application, the spring constant of an air suspension member and the damping force of a shock absorber are described as being altered by detecting the condition of a road surface on the basis of the acceleration of body movement. According to such prior art, the change in the vehicle height corresponding to the vertical movement of the vehicle is detected, and the spring constant of a suspension system, the damping force of a shock absorber, the stiffness of a joint rubber or the vehicle height is altered when the above-mentioned change in value is greater than a predetermined reference value.

Such prior art, however, have the following problems.

(1) In case a set average height of a vehicle is not in the standard position (NORMAL) but instead is in a high position (HIGH) for driving on a continuous rough road or in a low position (LOW) for high speed driving, the air suspension has been previously set in an expanded or a compressed condition. Consequently, when a vehicle passes over a bump or a dip of a same height, the suspension is apt to be fully compressed or a fully expanded in comparison with a case the vehicle height has been set in a standard position (NORMAL). Under these conditions, bumping between a bound stopper and the body or bumping between a rebound stopper and its seat occurs, which deteriorates riding comfort and increases noise.

(2) In order to cope with the above-mentioned problem, means have been provided for damping the vibration of the body by setting the reference value at a small value and altering the suspension characteristic before a big change in vehicle height is detected. In this case, however, the suspension characteristic is frequently altered corresponding even to a small change in the vehicle height when the predetermined average height is set in the standard (NORMAL) position, whereby riding comfort, controllablity and stability are deteriorated. Moreover, durability and reliability of suspension characteristic alteration actuators also become worse as the frequency of alteration increases.

SUMMARY OF THE INVENTION

In view of the prior art described above, it is an object of the present invention to provide a suspension controller in which the suspension characteristic is preferably altered even in a case where the set average height is not in the standard (NORMAL) position.

For the purpose of solving the above-mentioned problems, the present invention has the construction shown in FIG. 1, which shows a principle structure of the present invention. Namely, a suspension controller of this invention includes:

a vehicle height detection means M1 for detecting a vehicle height at a front wheel and for generating a vehicle height signal according to the distance;

conversion means M3 for converting the vehicle height signal into a corresponding converted height signal, wherein the converted height signal increases more sharply than the vehicle height signal when the vehicle height signal is greater than a preset value and decreases sharply when the vehicle height signal is less than another preset value;

control means M4 for generating a suspension characteristic alteration signal depending on the converted height signal; and suspension characteristic alteration means M2 for altering characteristics of suspensioning of the vehicle in response to the suspension characteristic alteration signal.

In the vehicle height detection M1, movement of a suspension arm against the body is, for example, detected by a potentiometer and the detected value is outputted as an analog signal. It is also possible to detect the abovementioned movement as a rotating angle of a slotted disk by counting the light passing the slots and to output the detected value as a digital signal. Here, the vehicle height data may be defined as the displacement from a predetermined standard height or the amplitude or vibration of the height signal. The displacement from a predetermined standard height is defined as the difference between the predetermined standard height and the current vehicle height. The amplitude of vibration of the height signal is defined as the difference between the maximum and the minimum values of the height signal detected within a certain time period.

The suspension characteristic alteration means M2 alters the suspension characteristic and the vehicle height. For example, the spring constant of the suspension, the damping force of the shock absorber, the characteristic of the bush and the stabilizer may be discretely or continuously changed. For air suspension systems, the spring constant may be changeable by connecting and disconnecting the main air chamber and the auxiliary air chamber. The damping force of the shock absorber is also changeable by altering the diameter of an orifice through which oil in the shock absorber flows. Moreover, the suspension characteristic can be changed into a 'HARD' state, 'SOFT' state or 'SPORT' state, i.e., a medium state between 'HARD' and 'SOFT'. For altering the height of a vehicle which installs air suspensions, the vehicle height may be raised (to 'HIGH' position) by transferring air into the air chamber by a compressor to enlarge the volume of the air chamber, and the body height is lowered (to be 'LOW' position) by opening the discharge valve to discharge air in the air chamber to reduce the volume of the air chamber. For altering the height of a vehicle utilizing an oil suspension system, the vehicle height may be changed discretely or continuously by controlling the feed and discharge of the working fluid the same as in the case of the above-mentioned air suspension.

The conversion means M3 functions to convert the vehicle height data detected by the vehicle height detection means M1 into the correspondingly converted height signal which increases more sharply than the height data when the vehicle height data is greater than a preset value, or an upper deflection value, and decreases more sharply when the vehicle height data is less than another preset value, or a lower deflection value. The preset values or deflection values may be set at the average vehicle height or they may be different to make a certain range. It is possible to perform the above-mentioned conversion only in case the set average height is greater than and/or less than a predetermined range.

The control means M4 serves to output a command to the suspension characteristic alteration means M2 so as to alter the suspension characteristic when the converted vehicle height data outputted from the conversion means M3 surpasses a reference value. For example, a predetermined number of converted data height signals outputted from the conversion means M3 are sampled and the difference between the maximum and the minimum values among them is calculated. If the calculated difference proves to be greater than a predetermined reference value, a command to alter the suspension characteristic is outputted to the means M2. The conversion means M3 and the control means M4 can comprise a logical circuit of discrete electronic elements. These means may be alternatively realized as a logic circuit of integrated dips having, e.g., a CPU, a ROM, a RAM and other peripheral circuit elements. These means as described above can provide output commands for converting vehicle height signals and for altering suspension characteristic in accordance with a predetermined operation procedure.

Each of the above-mentioned various elements constituting this invention acts in cooperation with the remaining elements so as to solve the technological problems of the prior art.

BRIEF DESCRIPTION OF DRAWINGS

The invention may be best understood by reference to the following detailed description of preferred embodiments and the accompanying drawings, wherein like reference numerals denotes like elements in which:

FIG. 8 is a table showing a relation between the converted height value and the output value of a vehicle height sensor in the first embodiment;

FIG. 10 is a table showing a relation among the first converted height value, the second converted height value and the output value of a vehicle height sensor in the second embodiment;

FIGS. 11A and 11B are flow charts which integrally shows the processings executed by the ECU in the second embodiment;

FIGS. 12A thru 17B illustrate examples of other apparatuses for altering the suspension characteristics, in which;

FIG. 12A is a vertical sectional view of a rubber bush as the first example;

FIG. 17B is a partially enlarged sectional view of a connecting device shown in FIG. 17A.

DESCRIPTION OF THE PREFERRED EMBODIMENTS

Figure 1:
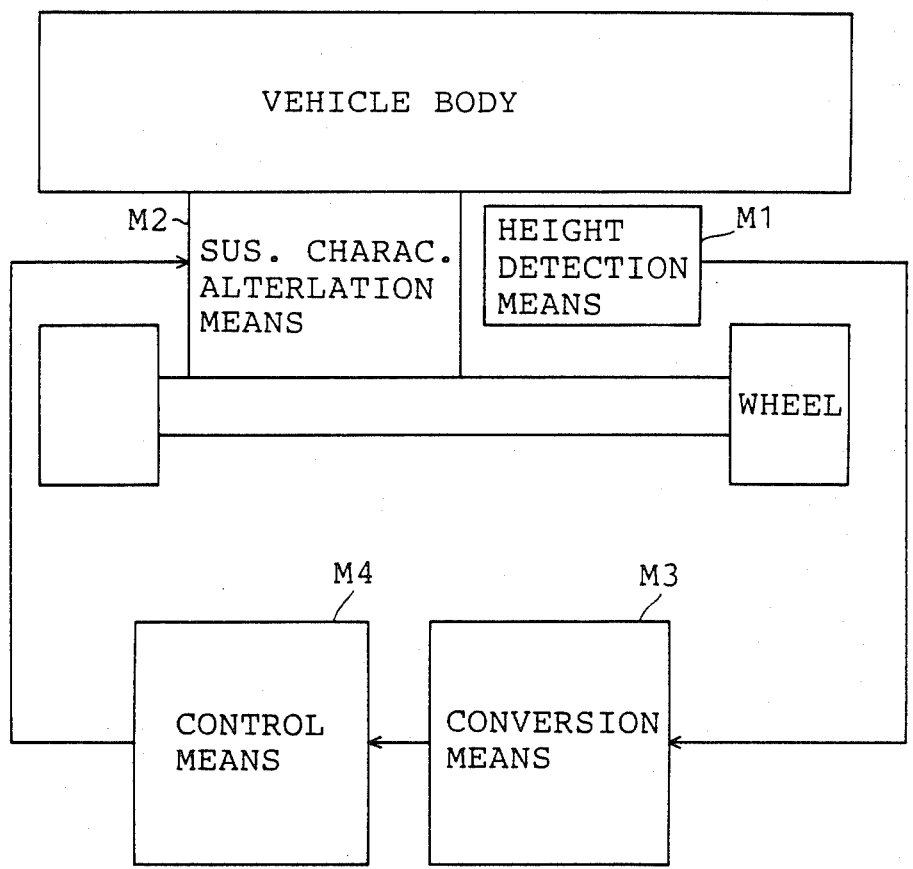
FIG. 1 shows an outline of the basic constitution of the present invention.

The embodiments of the present invention are hereinafter described in detail referring to the drawings.

Figure 2:
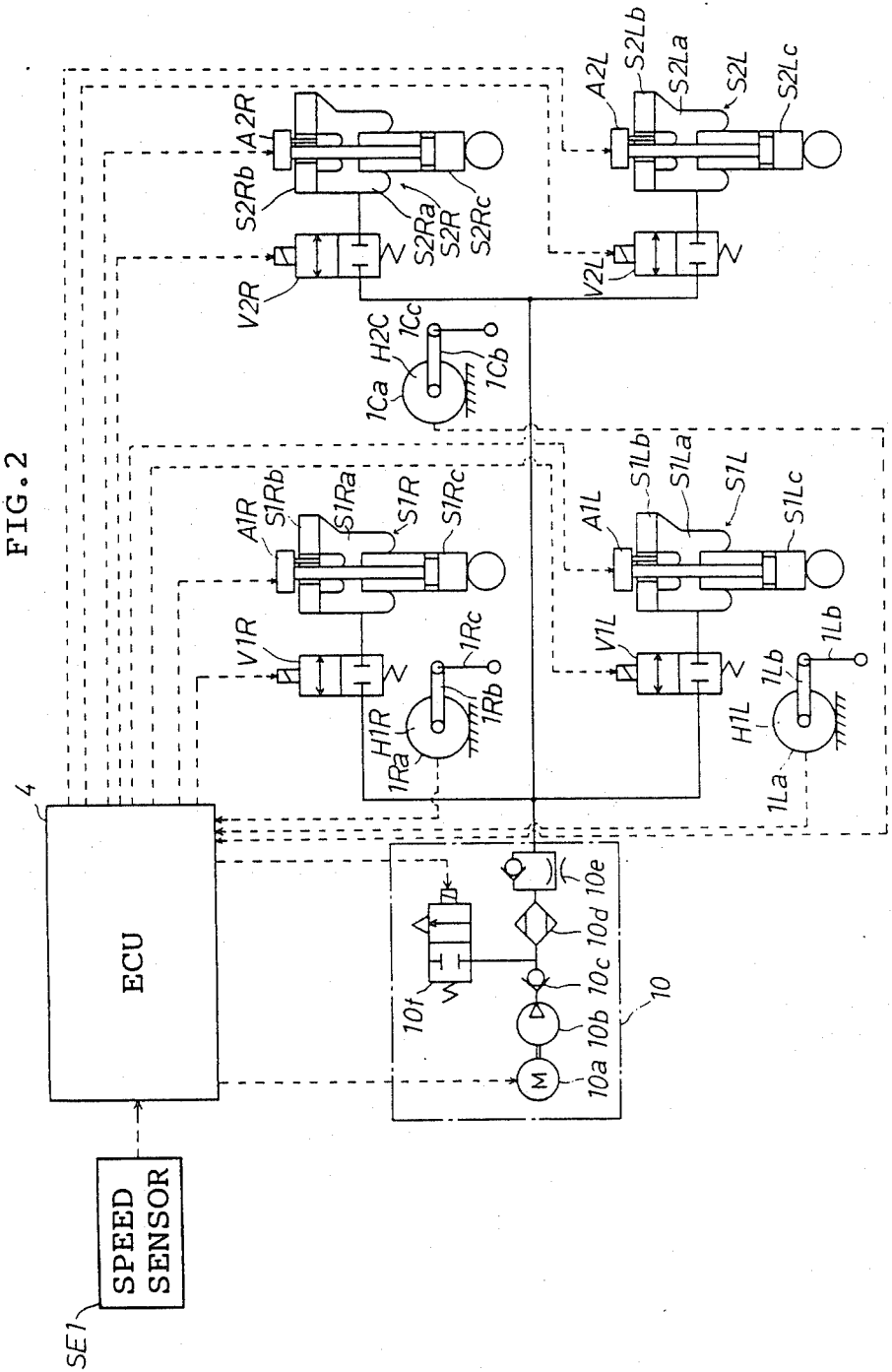
FIG. 2 shows a systematic constitution of a suspension controller according to the first embodiment of the present invention.

FIG. 2 shows details of the suspension controller for a vehicle utilizing the suspensions according to the first embodiment of the present invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. A rear vehicle height sensor H2C is provided between the vehicle body and a rear wheel to detect the distance between the vehicle body and a rear suspension arm. The short cylindrical bodies 1Ra, 1La and 1Ca of the vehicle height sensors H1R, H1L and H2C are secured on the vehicle body. Links 1Rb, 1Lb and 1Cb extend from the center shafts of the bodies 1Ra, 1La and 1Ca substantially perpendicularly to the center shafts. Turnbuckles 1Rc, 1lc and 1Cc are rotatably coupled to one end of the links 1Rb, 1Lb and 1Cb opposite the bodies 1Ra, 1La and 1Ca respectively. The other end of the turnbuckles 1Rc, 1Lc and 1Cc opposite the links are rotatably coupled to a portion of the suspension arms.

A plurality of light interrupters can be provided with vehicle height sensors H1R, H1L and H2C respectively for detecting the displacement of vehicle height as 4-bit vehicle height data by operating a dis so as to switch ON and OFF the light interrupters in response to the vehicle height, thus outputting digital signal. The above-mentioned disc is substantially provided coaxial with a center shaft of the vehicle height sensor and defines a slit thereon.

Set forth below is an explanation of air suspension members S1R, S1L, S2R and S2L. The air suspension member S2L is provided between the left rear suspension arm and the vehicle body in parallel with a suspension spring (not shown). The air suspension member S2L is composed of a main air chamber S2La functioning as an air spring, an auxiliary air chamber S2Lb, a shock absorber S2Lc, and an actuator A2L for altering the spring constant and the damping force of the shock absorber. The air suspension members S1R, S1L and S2R have similar components and functions as the above-mentioned air suspension member S2L, and are provided for the right front wheel, the left front wheel, and the right rear wheel, respectively.

A compressed air feed and discharge system 10 for an air spring of the air suspension members S1R, S1L, S2R and S2L operates a motor 10a to drive a compressor 10b for generating compressed air. The compressed air is led to an air drier 10d via a check valve 10c, where the compressed air moves from the compressor 10b side to the air drier 10d side. The air drier 10d functions to dry the compressed air supplied for the air suspension members S1R, S1L, S2R and S2L and to protect every part of the air suspension members S1R, S1L, S2R and S2L from moisture, besides preventing an abnormal pressure change accompanied with the corresponding phase change in each of main air chambers S1Ra, S1La, S2Ra and S2La and auxiliary air chambers S1Rb, S1Lb, S2Rb and S2Lb. In a check valve 10e, the compressed air moves from the compressor 10b side to each of the air suspension members S1R, S1L, S2R and S2L side. The check valve 10e opens its checking portion in feeding the compressed air, and closes its checking portion in discharging the compressed air to discharge the compressed air through the portion thereof. A discharging valve 10f is an electromagnetic valve of 2-port 2-position spring off-set type. Normally, the discharging valve 10f interrupts the air passage shown in FIG. 2, but in discharging the compressed air from the air suspension members S1R, S1L, S2R and S2L, the discharging valve 10f changes to connect the air passages and discharge the compressed air to the atmosphere via the check valve 10e with the fixed portion thereof and the air drier 10d.

Air spring feed and discharge valves V1R, V1L, V2R and V2L have the functions of adjusting the vehicle height, and are provided between the air suspensions members S1R, S1L, S2R and S2L, and the above-mentioned compressed air feed and discharge system 10, respectively. The air spring feed and discharge valves V1R, V1L, V2R and V2L are 2-port and 2-position electromagnetic valves of spring off-set type. These valves V1R, V1L, V2R and V2L normally interrupt the air passage shown in FIG. 2, and connect the air passage in adjusting the vehicle height. Namely, if the air spring feed and discharge valves V1R, V1L, V2R and V2L connect the air passage, the compressed air can be fed or discharged between the compressed air feed and discharge system 10 and the main air chambers S1Ra, S1La, S2Ra and S2La. If the air is fed, the volumes in the main air chambers S1Ra, S1La, S2Ra and S2La are increased to raise the vehicle height, and if the air is discharged due to the vehicle weight itself, the respective volumes thereof are decreased. In addition, if the feed and discharge valves V1R, V1L, V2R and V2L interrupt the air passage, the vehicle height remains unchanged. That is, by controlling the connection and disconnection between the above-mentioned discharging valve 10f of the compressed air feed and discharge system and each of the above-mentioned feed and discharge valves V1R, V1L, V2R, and V2L, the volumes of the main air chambers of the air suspension members S1R, S1L, S2R and S2L are altered for adjusting the vehicle height.

A vehicle speed sensor SE1 is provided in a speedometer and outputs signals in response to the vehicle speed.

Each signal outputted from the vehicle height sensors H1R, H1L, H2C and the vehicle speed sensor SE1 is inputted to an electronic control unit (ECU) 4. The ECU derives data from signals to process them and outputs a control signal to the air suspension actuators A1R, A1L, A2R and A2L, to the air spring feed and discharge valves V1R, V1L, V2R and V2L, and to the solenoids for the compressed air feed and discharge system 10.

Set forth below is an explanation of the systems of the main parts which constitute the air suspension members S1R, S1L, S2R and S2L on the basis of FIGS. 3 and 4. Each suspension has a similar system. The right rear air suspension member S2R is hereinafter described in detail.

Figure 3:
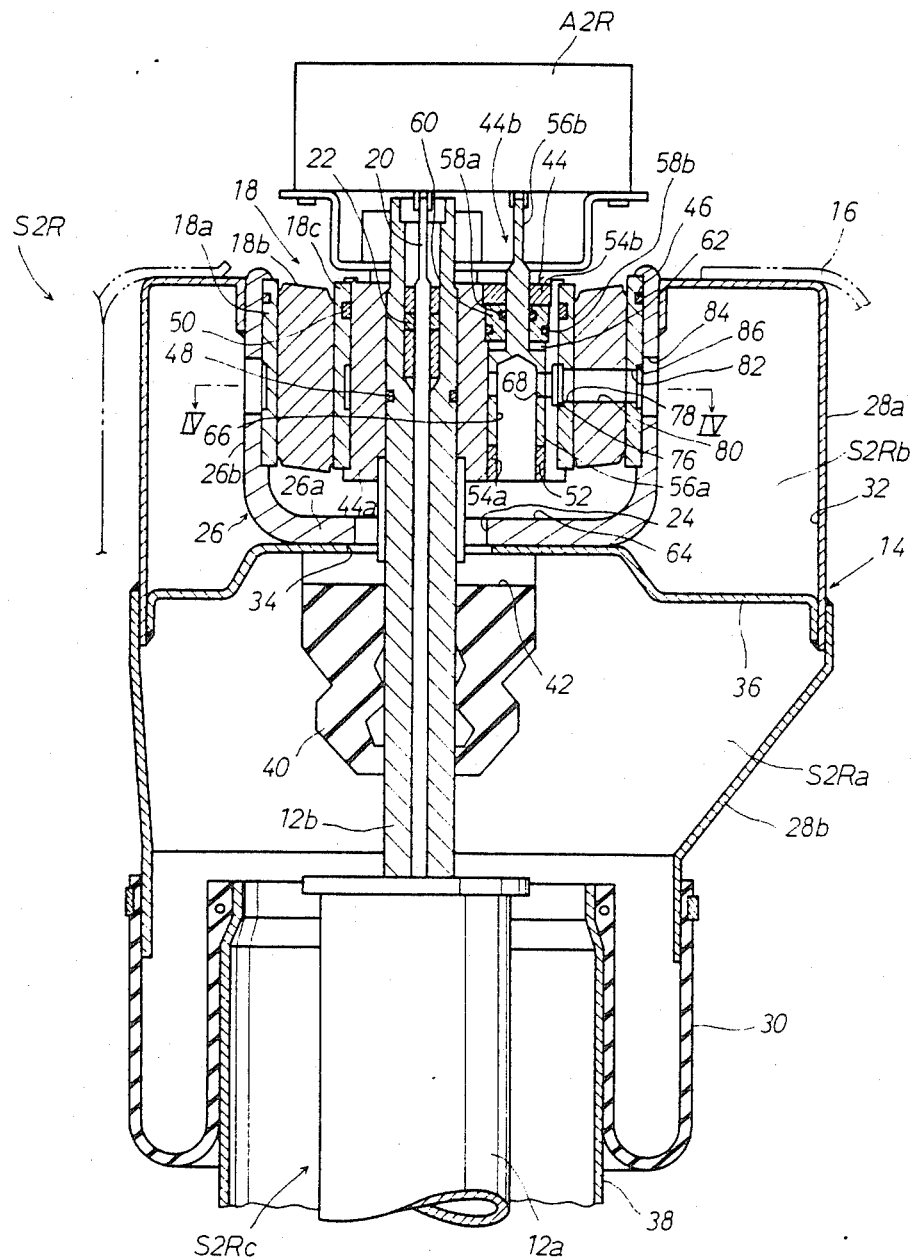
FIG. 3 is a cross-sectional view showing main parts of a suspension according to the first embodiment.

The air suspension member S2R includes a shock absorber S2Rc having a piston and a cylinder, and an air spring unit 14 provided in connection with the shock absorber S2Rc, shown in FIG. 3.

An axle (not shown) is supported at the lower end of the cylinder 12a of the shock absorber S2Rc. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber S2Rc allows for changing of its damping force for adjustment by operating the valve function of the piston. A control rod 20 for adjusting the damping force is liquid-tightly and rotatably fitted with a sealing member 22 in the piston rod 12b.

The air spring unit 14 has a chamber 12 which is defined by a circumferential member 26, an upper housing member 28a, a lower housing member 28b, and a diaphragm 30. The circumferential member 26 includes a bottom 26a having an opening 24, in which the piston rod 12b is inserted, and a wall 26b rising from the peripheral portion of the bottom 26a. The upper housing member 28a covers the circumferential member 26 and is secured on the vehicle body. The lower housing member 28b is open at the lower end and is coupled to the lower end of the upper housing member 28a. The diaphragm 30 includes an elastic material which closes the lower end of the lower housing member 28b. The chamber 32 is divided into a lower main air chamber S2Ra and an upper auxiliary air chamber S2Rb by a partition member 36, which is secured on the bottom 26a of the circumferential member 26 and which has an opening 34 corresponding to the opening 24 provided in the bottom 26a. Both the chambers S2Ra and S2Rb are filled with compressed air. The partition member 36 is provided with a buffer rubber 40 which can be brought into contact with the upper end of the cylinder 12a. The buffer rubber 40 has a passage 42 for connecting the openings 24 and 34 to the main air chamber S2Ra. The elastic cylindrical assembly 18 is disposed inside the circumferential member 26 whose wall 26b defines the inside circumferential surface of the auxiliary air chamber S2Rb, in such a manner that the assembly 18 surrounds the piston rod 12b.

The cylindrical elastic assembly 18 is provided with a valve unit 44 for controlling the connection of both the air chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18b. The outer cylinder 18a of the assembly 18 is press-fitted on the wall 26b of the circumferential member 26 secured on the vehicle body, under the action of the upper housing member 28a. A valve casing 44a of the valve unit 44, in which the piston rod 12b is inserted to extend, is secured on the inner cylinder 18c. Since the piston rod 12b is secured on the valve casing 44a, the piston rod is elastically connected to the vehicle body by the cylindrical elastic assembly 18. An annular air sealing member 46 is tightly packed between the outer cylinder 18a and the bottom 26b of the member 26. An annular air sealing member 48 is tightly packed between the piston rod 12b and the valve casing 44a. An annular air sealing member 50 is tightly packed between the inner cylinder 18c and the valve casing 44a.

The valve casing 44a has a hole 52 which is opened at both ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which is connected with the main air chamber S2Ra through the openings 24 and 34 and the passage 42 of the buffer rubber 40, is formed in the lower portion of the elastic cylindrical assembly 18. The main portion 56a of the valve 44b has a recess 66 open to the chamber 64, and has a connection passage 68 extending through the main portion 56a in a diametrical direction thereof across the recess 66.

Figure 4:
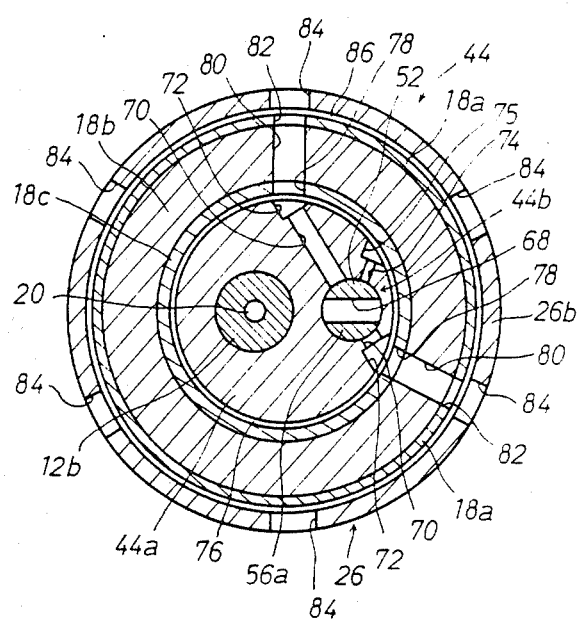
FIG. 4 is a cross-sectional view taken along line IV—IV of FIG. 3.

The valve casing 56b, which houses the valve 56a, has a pair of air passages 70, each of which can connect at one end with the connection passage 68, as shown in FIG. 4.

The air passages 70 extend outwards in a diametrical direction of the hole 52 toward the peripheral surface of the valve 44b. The other end of each air passage 70 is open to the peripheral surface of the valve casing 44a through a face hole 72. An air passage 74, which can connect at one end with the connection passage 68 of the hole 52, extends toward the peripheral surface of the valve casing 44a on the substantially same plane as the pair of air passages 70 and between them. The diameter of the air passage 74 is smaller than that of each of the air passages 70. The other end of the air passage 74 is open to the peripheral surface of the valve casing 44a through a face hole 75. The inside circumferential surface of the inner cylinder 18c, covering the peripheral surface of the valve casing 44a, has an annular recess 76 which surrounds the peripheral surface of the valve casing 44a in order to connect the face holes 72 and 75 of the air passages 70 and 74 to each other.

The inner cylindrical 18c has an openings 78 which are open to the recess 76 which constitutes an annular air passage. The cylindrical elastic member 18b has through holes 80, which extend outwards in the radial direction of the member 18b corresponding to the openings 78. The through holes 80 are opened to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a is provided with a plurality of openings 84 which are located at equal intervals in the circumferential direction of the member 26 and extend continuously to the auxiliary air chamber S2Rb to connect the openings 78 and 82 and the through holes 80 to the auxiliary air chamber S2Lb. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

In the embodiment shown in FIG. 4, the positions of the openings 78 and 82 and the through holes 80 are defined by the positions of the two air passages 70 of the valve casing 44a. The air passages 70 and 74 can be optionally provided in positions in the circumferential direction of the elastic member 18b since the annular recess 76, with which the air passages 70 and 74 are connected, is formed between the inner cylinder 18c and the valve casing 44a.

A control rod 20 for adjusting the damping force of the shock absorber S2Rc, and a prior actuator A2R for rotating the valve 44b of the valve unit 44, are provided at the upper end of the piston rod 12b, as shown FIG. 3.

Since the air suspension member S2R has the above-mentioned construction, the air suspension member operates as described hereinafter.

When the valve 44b is kept in a closed position as shown in FIG. 4 wherein the connection passage 68 of the valve does not connect with any of the air passages 70 and 74 of the valve casing 44a, the main air chamber S2Ra and the auxiliary air chamber S2Rb are disconnected from each other so that the spring constant of the suspension member S2R is set at a large value.

When the actuator A2R has rotated the valve 44b into such a position that the connection passage 68 of the valve connects with the large-diameter air passages 70 of the valve casing 44a, the main air chamber S2Ra is connected to the auxiliary air chamber S2Rb through the connection passage 68 communicating with the main air chamber, the large-diameter air passages 70 and the openings 78 and through holes 80 of the elastic assembly 18 and the openings 82 and 84, so that the spring constant of the suspension member S2R is set at a small value.

When the valve 44b is rotated into such a position by the actuator A2R that the connection passage 68 of the valve connects with the small-diameter air passage 74 of the valve casing 44a, the main air chamber S2Ra is connected with the auxiliary air chamber S2Rb through the connection passage 68, the small-diameter air passage 74, the annular recess 76, the openings 78 and 82 and the through holes 80 of the elastic assembly 18 and the openings 84, thus the spring constant of the suspension S2R is set at an intermediate value. This is because the small-diameter air passage 74 provides a higher air flow resistance than the large-diameter air passages 70.

Figure 5:
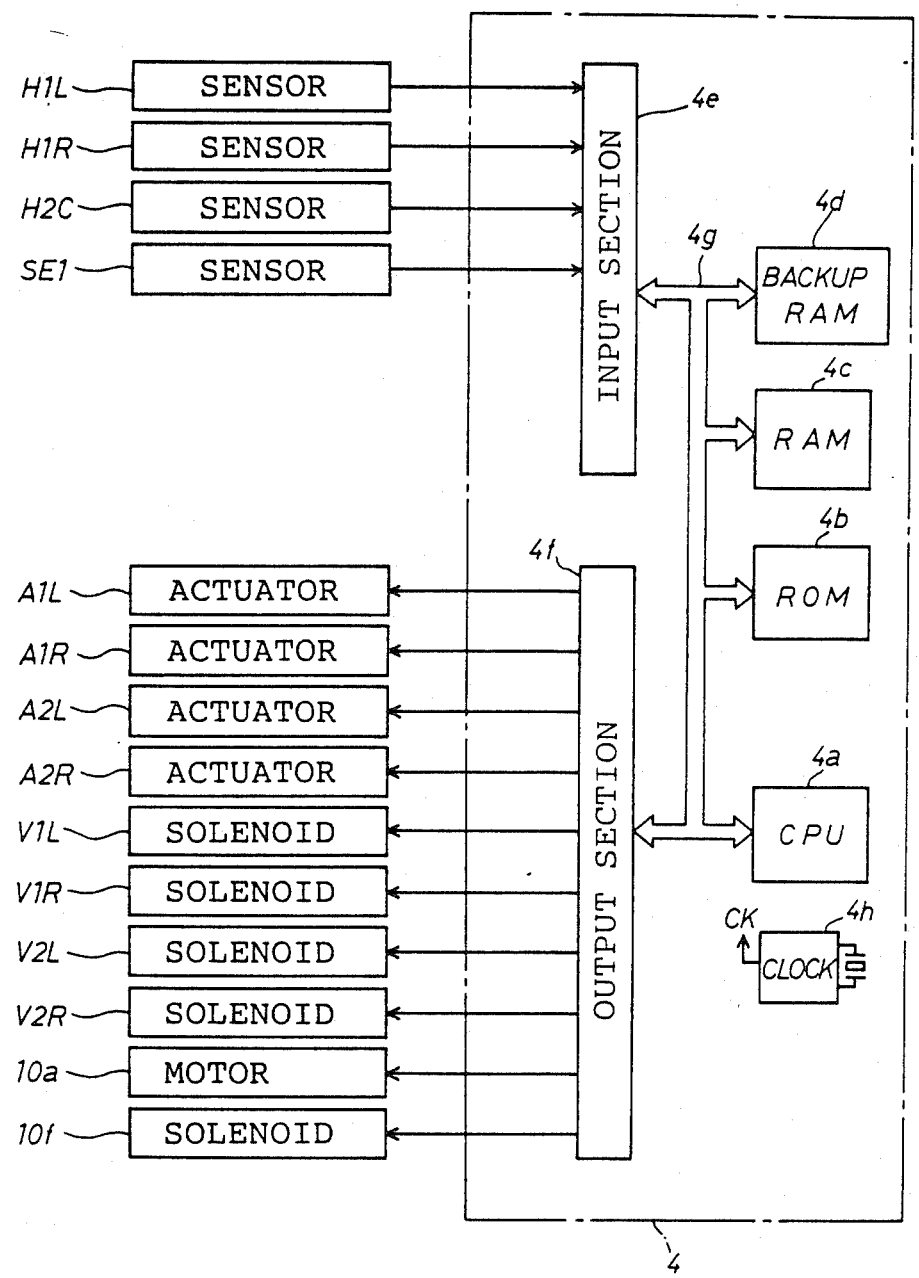
FIG. 5 is an explanatory block diagram showing the construction of an electronic control unit (ECU)

FIG. 5 shows the construction of the ECU 4. The ECU 4 includes a Central Processing Unit (CPU) 4a, a Read Only Memory (ROM) 4b, a Random Access Memory (RAM) 4c, a back-up Random Access Memory (back-up RAM) 4d, an input section 4e, an output section 4f, a bus line 4g and a clock circuit 4h. The CPU 4a receives output data from the sensors to process them according to a control program for controlling various apparatuses, means or the like. In the ROM 4b, the control program and initial data are stored. The RAM 4c functions to write and read out data, which the ECU 4 receives for the control. The backup RAM 4d is backed up by a battery so as to retain data even if the ignition key switch of the automobile is turned off. The input section 4e includes an input port (not shown), a waveshaping circuit (as occasion demands), a multiplexer which selectively sends out output signals from the sensors to the CPU 4a, and an A/D converter which converts an analog signal into a digital signal. The output section 4f includes an output port (not shown), and a drive circuit for driving the actuators according to the control signal of the CPU 4a as occasion demands. The bus line 4g connects the element, such as the CPU 4a, the ROM 4b, and the input and the output sections 4e and 4f, with each other so as to transmit data from each element. The clock circuit 4h sends out a clock signal for informing the control timing at predetermined time intervals to the CPU 4a, the ROM 4b, the RAM 4c, etc.

Figure 6:
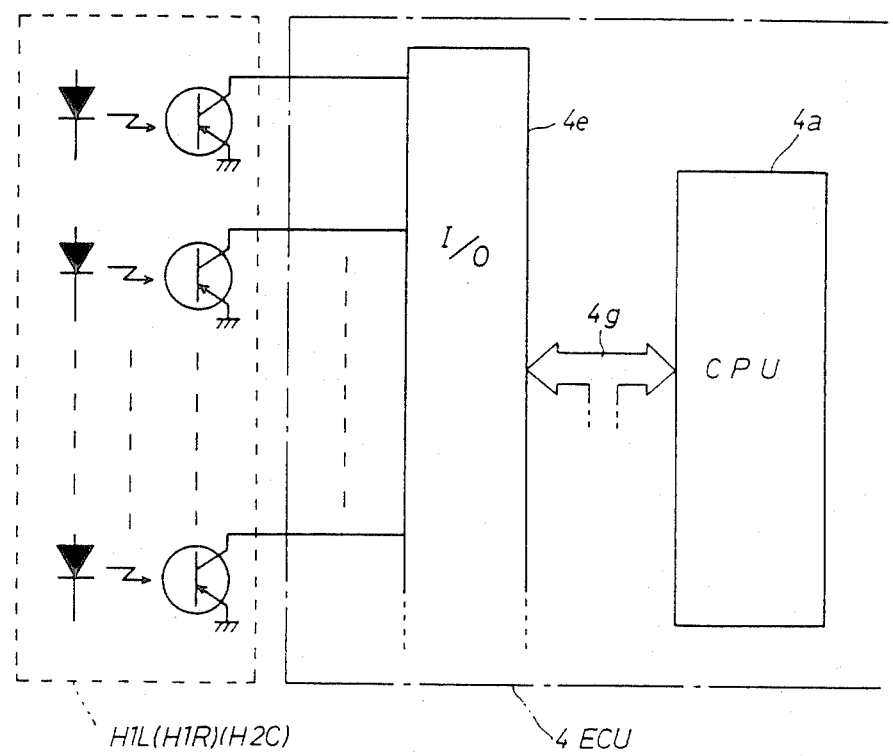
FIG. 6 is a block diagram showing a digital signal input section and a corresponding vehicle height sensor.
Figure 7:
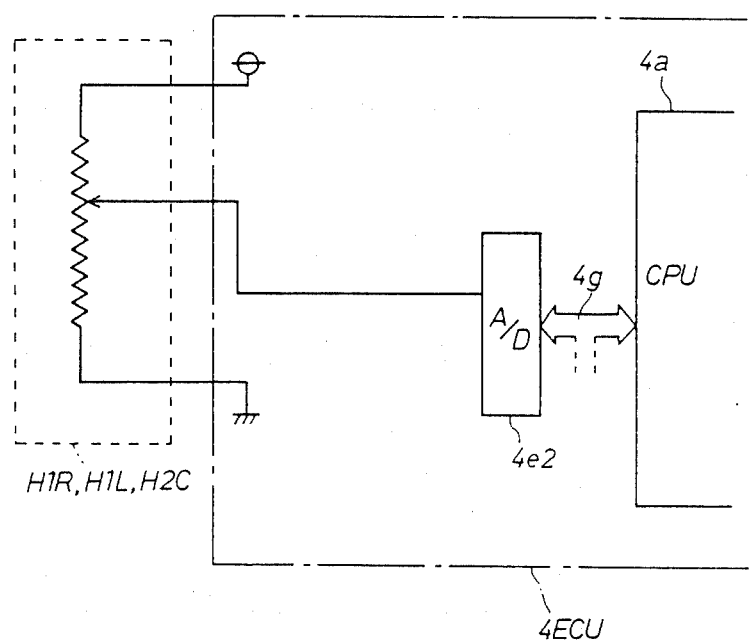
FIG. 7 is a block diagram showing an analog signal input section and a corresponding vehicle height sensor.

If the signals outputted from the vehicle height sensors H1R, H1L and H2C are 4-bit digital signals, they are transmitted to the CPU 4a via the input section 4e as shown in FIG. 6. On the contrary, if being analog signals, they are converted into digital ones and are then transmitted to the CPU 4a as shown in FIG. 7.

The converted height value Hm to be utilized in the first embodiment of this invention is hereinafter described in reference to FIG. 8. The front vehicle height sensors H1L and H1R detect the distance between respective front wheels and a body as a vehicle height. As shown in FIG. 8, the vehicle height is denoted as 16 levels of 4-bit data centering the standard position (NORMAL). When a wheel encounters a bump, i.e., in the so-called bound state, the vehicle height data is outputted at a low level (LOW) through an extra-low level. Alternatively, when the wheel encounters a dip, i.e., in the so-called rebound state, the vehicle height data is outputted at a high level (HIGH) through an extra-high level.

the output values of the vehicle height sensors are proportional to the actual vehicle height, i.e., the distance between the wheel and the body. The converted height value Hm is also proportional to the outputted vehicle height data in the range from near 'LOW' position to near 'HIGH' position. On the other hand, for example, the output value 2 of the vehicle height sensor is converted into 5 as a converted height value Hm near the full bound state, and in the same manner, the output value 15 of the vehicle height sensor is converted into 22 near the full rebound state. The converted height value Hm, therefore, changes sharply when it approaches to the full bound or the full rebound state, while not changing at regular intervals. The conversion table which indicates the relation between the output value of the vehicle height sensors and the converted height value Hm shown in FIG. 8 has been stored in a predetermined area in a ROM 4b of the ECU 4. In the ECU, the output values of the front vehicle height sensors H1L and H1R are converted into the converted height values Hm on the basis of the table of FIG. 8, and the converted values are used in the aftermentioned suspension control processings. In the first embodiment of the present invention, the criterion distance HH0 for altering suspension characteristics is 6 in the converted height value. Therefore, when the set average height is near the standard (NORMAL) position, the converted height value Hm is not increased by 6, e.g., from 11 to 17, unless the output value of the vehicle height sensor is practically increased by 6, e.g., from 6 to 12. That is, the suspension characteristic is never altered unless the actual height value is increased by 6 points. Near the full bound state, however, the converted height data Hm is changed by 7 points from 19 to 26, when the output data of the vehicle height sensor is actually changed by only 2 points from 14 to 16. Thus, the suspension characteristic is altered even though the vehicle height is changed by only 2 points. By utilizing the table of this embodiment, the output value of the vehicle height sensor is increased sharply near the full rebound state, and decreased sharply near the full bound state in comparison with the actual output data of the vehicle height sensor.

Figure 9A:
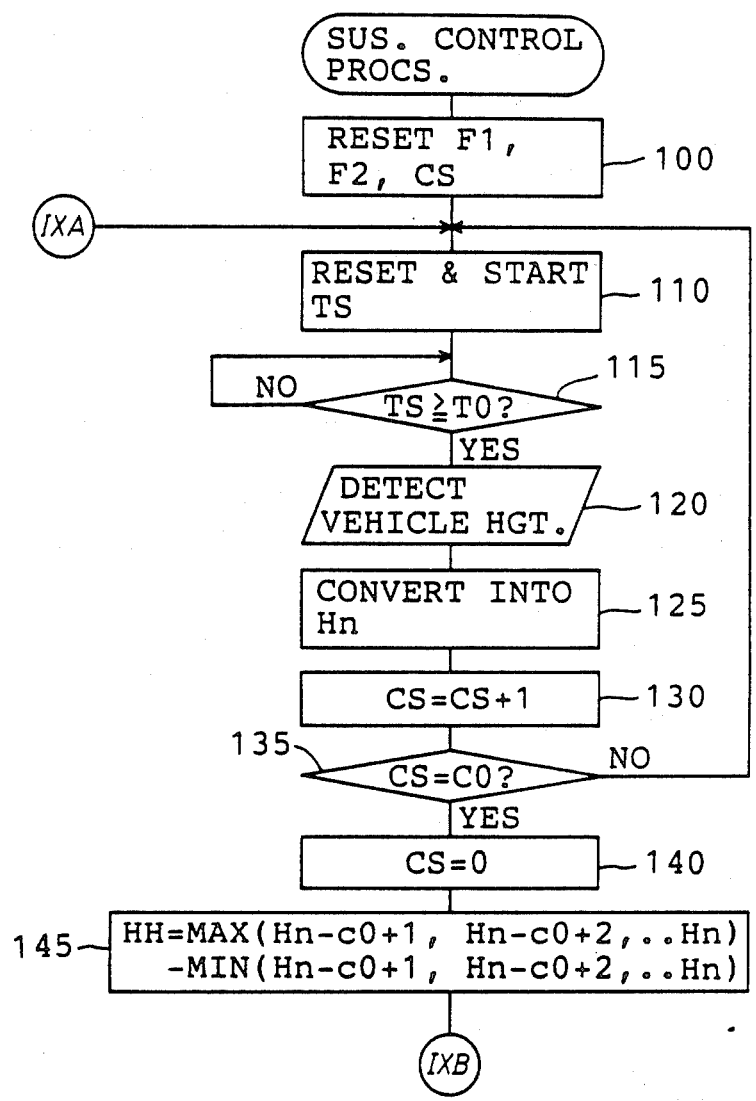
FIGS. 9A and 9B are flow charts showing the processings executed by the ECU in the first embodiment.
Figure 9B:
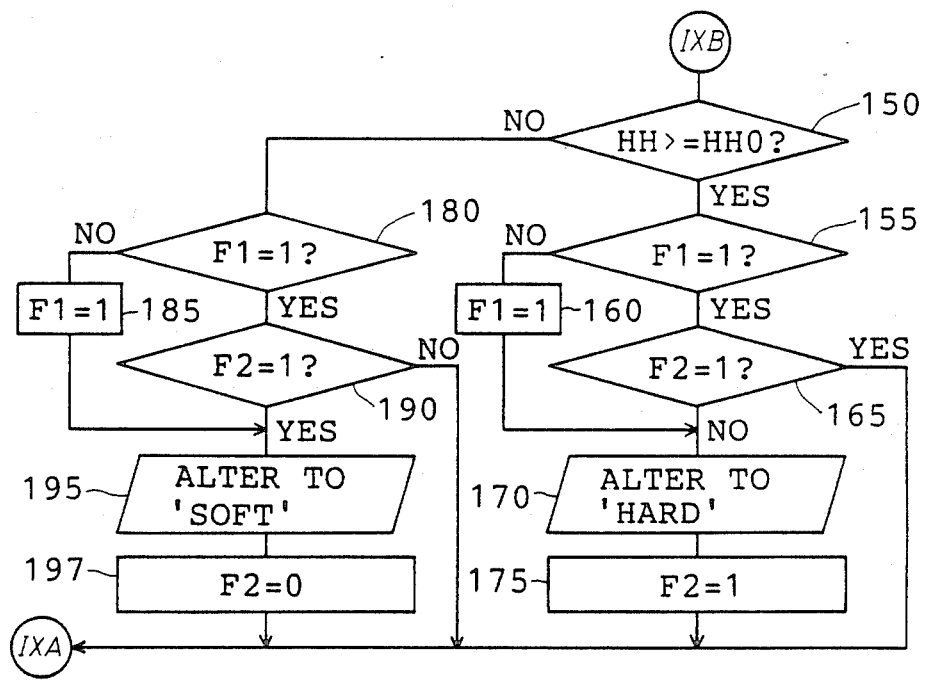

Next, the suspension control processings executed by the ECU 4 in the first embodiment is hereinafter described with reference to the flow charts of FIGS. 9A and 9B. The suspension control processing is performed when a vehicle is in a normal driving condition after starting and acceleration, and then an automatic mode (AUTO) is selected by a driver. The outline of this processing is as follows. For convenience, the converted height value Hm is shown as only H. The values Hn—c0+1 mean a converted height values sequentially detected C0 times which is indicative of the sampling number.

(1) the vehicle height is detected at time intervals of T0, and the results are converted into the converted height value Hn (steps 120, 125);

(2) the difference HH between the maximum and the minimum values of the converted height values Hn−c0+1 through Hn which are continuously detected C0 times is calculated (steps 135, 140, 145);

(3) if the difference HH calculated in (2) is greater than the criterion distance HH0, the vibration surpassed a predetermined range, and the suspension characteristic is altered to the 'HARD' state (steps 150, 170); and (4) if the difference HH calculated in (2) is less than the criterion distance HH0, the vibration proves to have been damped within the predetermined range, and the suspension characteristic is altered to 'SOFT' state (steps 150, 195).

The detailed explanation of the suspension control processings is as follows. At step 100, flags F1 and F2, and a counter CS are reset. The flag F1 is used for determining if this routine is executed for the first time.

At first, the value is reset to 0. For the second time and after, the value is set to 1. The flag F2 indicates the current state of the suspension characteristic. The value is set to 1 in the 'HARD' state, and it is reset to 0 in the 'SOFT' state. The counter CS is for counting the number of the converted height value Hn. Then, the processing is advanced to step 110. After a timer TS for counting the time interval for detecting vehicle height is reset, the counting is started. At step 115, the value of the timer TS is compared with a vehicle height detecting time interval T0. If the value of the timer TS is less than T0, the step is repeated until the value of the timer TS reaches the time interval T0. If the value of the timer TS reaches the time T0, the processing proceeds to step 120 at which the output value of the front vehicle height sensor H1L or H2R is detected. At step 125, the output value of the vehicle height sensor detected at step 120 is converted into the converted height value Hn on the basis of the table described before. At step 130, 1 is added to the value of the counter CS. Then, the processing proceeds to step 135 at which the value of the counter CS is determined if it was equal to the predetermined sampling number C0. If the number of the detected height data is fewer than the sampling number, the processing returns to step 110, and the detection of the vehicle height is repeated. In case the number of detected height data is equal to the sampling number, the processing proceeds to step 140 at which the counter CS is reset.

At step 145, the difference HH between the max. and the min. values of the converted height values Hn−c0+1 through Hn which are detected C0 times (C0: sampling number) is calculated. At step 150, it is determined if the value HH calculated in step 145 is greater than the value of the criterion distance HH0. If the value HH is greater than the value HH0, the vibration of the body proves to be outside the predetermined range, and the processing proceeds to step 155.

At step 155, the condition of the flag F1 is determined. If this step is performed for the first time, the flag F1 is set to be 1 at step 160 and the processing is advanced to step 170. For the second time and after, the processing proceeds to step 165, where the condition of the flag F2 is determined. In case the current suspension characteristic is in 'HARD' state, the processing returns to step 110. If in 'SOFT' state, the processing proceeds to step 170, at which the suspension characteristic is altered to 'HARD' state. First, the rotary valve 44b and the control rod 20 are rotated by suspension characteristic alteration actuators A1L, A1R, A2L and A2R. Thereby, main air chambers S1La, S1Ra, S2La and S2Ra and auxiliary air chambers S1Lb, S1Rb, S2Lb and S2Rb of air suspensions S1L, S1R, S2L and S2R are disconnected from each other so as to increase the spring constant and to improve the damping force of shock absorbers S1Lc, S1Rc, S2Lc and S2Rc. At step 175, the value of flag F2 is set to 1 for indicating that the present suspension characteristic is in the 'HARD' state, and then the processing returns to step 110.

On the other hand, if the value HH detected at step 145 is less than the value HH0 at step 150, the vibration of the body proves to be damped within the predetermined range, and the processing proceeds to step 180.

At step 180, the condition of the flag F1 is determined. If this step is performed for the first time in the present processing, the processing is proceeded to step 185, where the value of flag F1 is set to 1, and succeedingly the processing proceeds to step 195. For the second time and after, the processing proceeds to step 190 at which the condition of the flag F2 is determined. When the suspension characteristic has been already in the 'SOFT' state, the processing returns to step 110. If the suspension characteristic is in 'HARD' state, the processing proceeds to step 195, where the suspension characteristic is altered to the 'SOFT' state as follows. The main air chambers S1La, S1Ra, S2La and S2Ra and the auxiliary air chambers S1La, S1Lb, S2Ra and S2Rb of the air suspensions S1L. S1R, S2L and S2R are connected with each other so as to decrease the spring constant and the damping force of the shock absorbers S1Lc, S1Rc, S2Lc and S2Rc are decreased also. At step 197, the value of the flag F2 is reset to be 0 to indicate that the current suspension characteristic is in the 'SOFT' state, and the processing returns to step 110. The present processing is repeatedly performed during the time period the vehicle is driven.

In the first embodiment, the front vehicle height sensors H1L and H1R, the ECU 4 and the processing step 120 performed by the ECU 4 function as the vehicle height detection means M1, and the suspension characteristic alteration actuators A1L, A1R, A2L and A2R, the air suspension members S1L, S1R, S2L and S2R, a compressed air feed and discharge system 10 and air spring feed and discharge valves V1L, V1R, V2L and V2R function as the suspension characteristic alteration means M2. In addition, the ECU 4 and the processing step 125 practiced by the ECU function as the conversion means M3, and the ECU and the processing steps 145, 150, 170 and 190 performed by the ECU function as the control means M4.

As described above, in the first embodiment, the acutal output value of the front vehicle height sensor H1L or H1R is converted into the converted height values Hn according to a table in which the converted height value sharply changes near the full bound position or the full rebound position. The converted height values Hn are detected C0 times consecutively, and the difference HH between the maximum and the minimum values of the detected values Hn is compared with the value of the criterion distance for alteration HH0. If the difference HH is not less than the value HH0, the suspension characteristic is altered to the 'HARD' state. If the difference HH is less than the value HH0, the suspension characteristic is altered to the 'SOFT' state. Because of this, when the vehicle height has been set in a relatively higher position (HIGH) or a lower position (LOW) than usual, the converted height value Hn largely changes against even a small change in vehicle height, and the suspension characteristic is altered to the 'HARD' state. Therefore, the vibration of the body is quickly damped and the bumping of a bound stopper or a rebound stopper can be prevented, which results in improving riding comfort as well as decreasing noises.

In case the body bounces terribly due to the bad road conditions, the suspension characteristic is altered to the 'HARD' state, and it is altered to the 'SOFT' state when the vibration is damped regardless of the vehicle position. This makes it possible to improve riding comfort, controllability and stability. Since the pitching and the bouncing of the body can be damped, car sickness may be prevented and a sudden change of the attitude of the body during turning or braking may be also prevented.

When the set average height is near the standard height (NORMAL), large changes do not occur in the converted height value until the change of the vehicle height are large, therefore, the frequency of alteration of the suspension characteristic is decreased, whereby durability and reliability of the suspension characteristic alteration actuators A1L, A1R, A2L and A2R are improved.

Explanations relating to the second embodiment are hereinafter described. The difference between the second embodiment and the first embodiment is that only one converted height value corresponds to an output value of the vehicle height sensor in the table in the first embodiment, while two converted height values correspond to an output value of the vehicle height sensor and these two values are alternatively used in response to the current set average height in the second embodiment. Since the systematic structure of the second embodiment is same as that of the first embodiment, each element is indentified by the same number and the explanation thereof has been set forth in the discussion regarding to the first embodiment. The following is the explanation of a table indicating the relation between the converted height value Hm and the output value of the vehicle height sensor in the second embodiment referring to FIG. 10. In this embodiment, the output of the vehicle height sensor is indicated by 26 levels of 5-bit data proportional to the actual vehicle height, i.e., the distance between the wheel and the body. The first converted height value is decreased or increased sharply in response to the actual output value of the vehicle height sensor near the full bound state or near the full bound state as in the first embodiment. On the other hand, the second converted height value is defined to be the same as the output value of the vehicle height sensor at every height through the whole range.

Figure 11B:
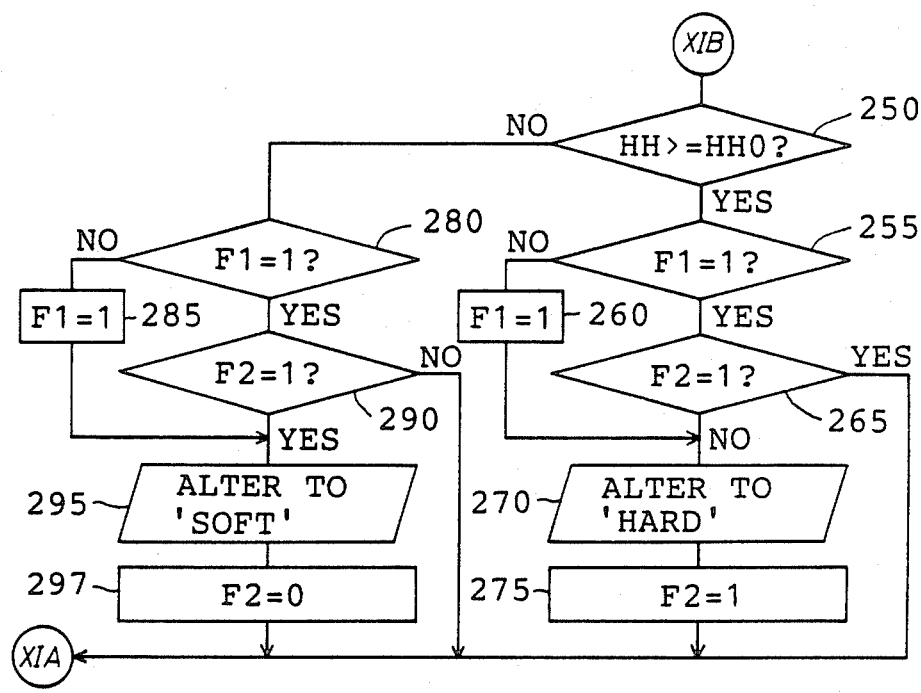

Next, the suspension control processing performed by the ECU 4 in the second embodiment is hereinafter described according to the flow charts of FIGS. 11A and 11B. Concerning processing steps whose contents are the same as those of the first embodiment, wherein the last 2 digits of the step number are the same as those of the first embodiment, and for an explanation of the same, reference is made to the first embodiment.

In the suspension control processing according to the second embodiment, flags F1, F2 and a counter CS are reset at step 200, and the processing proceeds to step 202. At step 202, it is determined if the current set vehicle height is in the 'HIGH' position. If the result is 'YES', the processing step is advanced to step 208. If the result is 'NO', the processing step proceeds to step 204, at which the current set vehicle height is judged to determine if it is in the 'LOW' position. If the result is 'YES', the processing step is advanced to step 208. If 'NO', the processing step proceeds to step 206. At step 206, the vehicle height is determined as 'NORMAL' position, and the output data of the vehicle height sensor is converted to the second converted height value. At step 208, the set vehicle height is determined to be in the 'HIGH' or 'LOW' position, and the output data of the vehicle height sensor is converted into the first converted height value. The processings at step 210 and thereafter are same as those in the first embodiment.

In the second embodiment, the front vehicle height sensors H1L and H1R, the ECU 4 and the processing step (step 220) executed by the ECU 4 functions as the vehicle height detection means M1. Also, the suspension characteristic alteration actuators A1L, A1R, A2L and A2R, the air suspension members S1L, S1R, S2L and S2R, the compressed air feed and discharge system 10, and the air spring feed and discharge valves V1L, V1R, V2L and V2R function as the suspension characteristic alteration means M2. Moreover, the ECU and the processings (steps 202, 204, 206, 208 and 225) executed by the ECU 4 correspond to the conversion means M3, and the ECU 4 and the processings (step 245, 250, 270, and 295) performed by the ECU 4 function as the control means M4.

According to the second embodiment, as described in the above, when the set vehicle height is in the 'NORMAL' position, the second converted height value is used, while the first converted value is utilized in case the set vehicle height is in the 'HIGH' or 'LOW' position. The second embodiment, therefore, brings the following effects in addition to those of the first embodiment.

When the set vehicle height is set in the 'NORMAL' position, the second converted height value is used, that is, the output data of the vehicle height sensor is converted into the same value at every height through the whole range. Because of this, the displacement of the vehicle height is directly used for the suspension characteristic alteration and the frequency for altering the suspension characteristic is decreased, thereby the riding comfort is improved.

Since the output data of the vehicle height sensor are outputted as 26 levels of 5-bit data and, for each of which, the first and the second converted values are correspondingly provided, both the accuracy in detecting the vehicle height and that in controlling the suspension characteristic alteration can be improved. Furthermore, the first and the second converted height values are automatically selected in response to the set average height, therefore, what the driver has to do is just to set the vehicle height during driving. As a result, the drivability is improved.

Examples of other rear suspension characteristic alteration means not for any air suspension or shock absorber are described below.

Figure 12A:
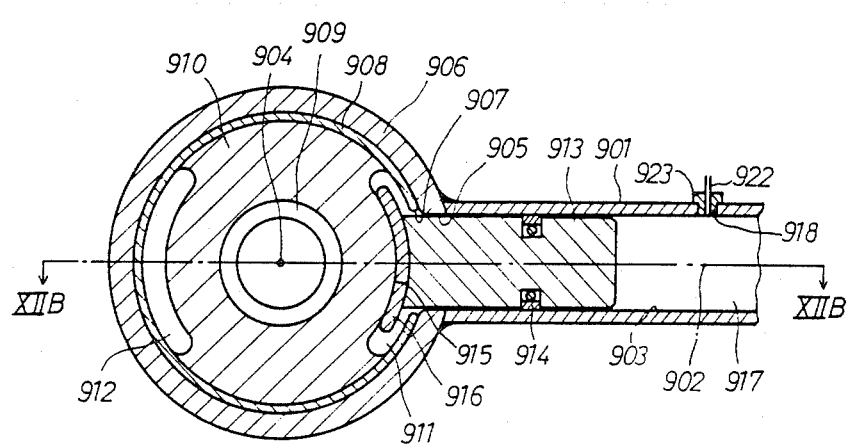
Figure 12B:
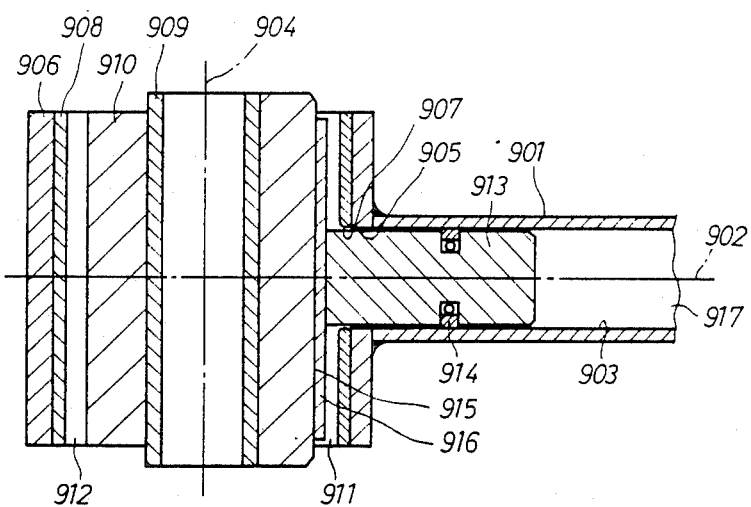
FIG. 12B is a cross-sectional view of the first example taken along line of XIIB—XIIB.

The first example is a bush for joining suspension bars such as the upper and lower control arms of a suspension, as shown in FIGS. 12A and 12B. The stiffness of the bush can be changed so as to alter the characteristic of the suspension. The spring constant and damping force of the bush are varied accompanied with changes of the bush stiffness.

FIG. 12A shows a sectional view of the joint of the suspension bar. FIG. 12B shows a sectional view taken on line XIIB—XIIB of FIG. 12A. In the drawings, numeral 901 designates a control arm extending along an axis 902 and having a hole 903. A sleeve 906, which extends along an axis 904 perpendicular to the axis 902 and which has a hole 905, is welded around the hole 905 at one end of the control arm 901. An outer cylinder 908 having a hole 907 is press-fitted in the sleeve 906. An inner cylinder 909 is provided in the outer cylinder 908 concentrically thereto. A bush 910 made of vibration-proof rubber is interposed between the outer cylinder 908 and the inner cylinder 909. The bush 910 and the outer cylinder 908 define arc-shaped openings 911 and 912 which are located to be opposed to each other along the axis 904, thus the stiffness in the direction of the axis 902 is set at a relatively low value. The hole 903 of the control arm 901 constitutes a cylinder which supports a piston 913 for movement back and forth along the axis 902. A sealing member 914 is tightly packed between the piston 913 and the inside surface of the hole 903. A contact plate 916 is secured at one end of the piston 913. The contact plate 916 curves about and extends along the axis 904, thus being brought into contact with the inside surface 915 of the opening 911.

The other end of the control arm 901 is constructed the same as shown in FIGS. 12A and 12B. A cylinder chamber 917 is defined between the piston 913 and another piston (not shown) and is fitted with the other end of the control arm 901. The cylinder chamber 917 is connected with the exterior through a tapped hole 918 provided in the control arm 901. A nipple 923, fixed on one end 922 of a conduit connected to an oil pressure source (not shown), is secured in the tapped hole 918 to apply oil pressure to the cylinder chamber 917.

When the oil pressure in the cylinder chamber 917 is relatively low, the force pushing the piston 913 leftward in the drawings is so weak that the piston is held in such a position that the contact plate 916 is brought into light contact with the inner surface 915 of the bush 910. As a result, the stiffness of the bush 910 in the direction of the axis 902 is made relatively low. When the oil pressure in the cylinder chamber 917 is relatively high, the piston 913 is driven leftward in the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is raised.

If the suspension bar is provided between the body and the wheel of a vehicle, the characteristic of the suspension for the rear wheel can be altered by controlling the oil pressure in the cylinder chamber 917 through the action of an actuator such as a pressure control valve. When the oil pressure is raised by an instruction from the ECU 4, the stiffness of the brush 910 is enhanced to increase the damping force and spring constant of the suspension. Thus, the suspension characteristic is altered to 'HARD' state so as to improve the controllability and stability of the vehicle. When the oil pressure is lowered, the damping force for the rear part of the vehicle is reduced.

Figure 13A:
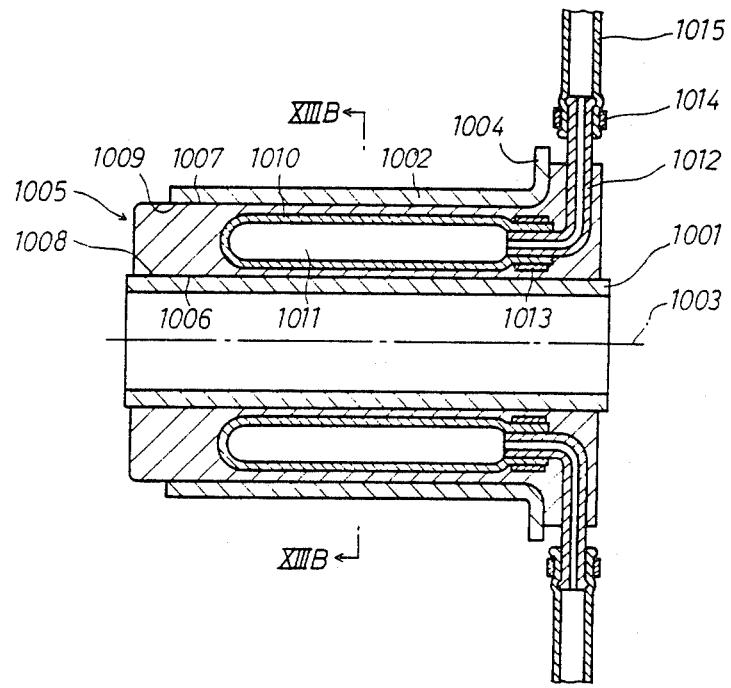
FIG. 13A is a sectional view of another rubber bush as the second example.
Figure 13B:
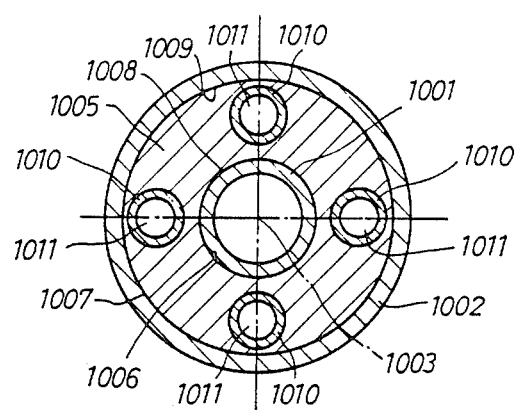
FIG. 13B is a sectional view of the second example taken along line of XIIIB—XIIIB.

The second example is another bush which is shown in FIGS. 13A and 13B and which have the same function as the former.

FIG. 13A shows a sectional view of the bush integrally constructed with inner and outer cylinders as a bush assembly. FIG. 13B shows a sectional view taken on line XIIIB—XIIIB of FIG. 13A. In the drawings, four expansible and compressible hollow bags 1010, which extend along an axis 1003 and which are separately located in equiangular positions around the axis, are embedded in a bush 1005. The hollow bags 1010 define four chambers 1011 extending along the axis 1003 and being separately located at equiangular positions around the axis. Each hollow bag 1010 is secured at one end on one end of a coupler 1012, embedded in the bush 1005 by a clamp 1013, so as to connect the chambers 1011 with the exterior by means of the coupler 1012. One end of a hose 1015 is fixedly connected to the other end of the coupler 1012 by a clamp 1014, and the other end of the hose 1015 is connected to a compressed air source by means of an actuator such as a pressure control valve (not shown). The controlled air pressure can be introduced into each chamber 1011. When the actuator is put in operation by the ECU 4, the air pressure in each chamber 1011 can be varied to change the stiffness of the bush in a stepless manner. The stiffness of the bush can thus be appropriately altered to be high (HARD) or low (SOFT) after a shock at the front wheels is detected.

FIGS. 14A–14G show a construction of a stabilizer as the third example.

Figure 14A:
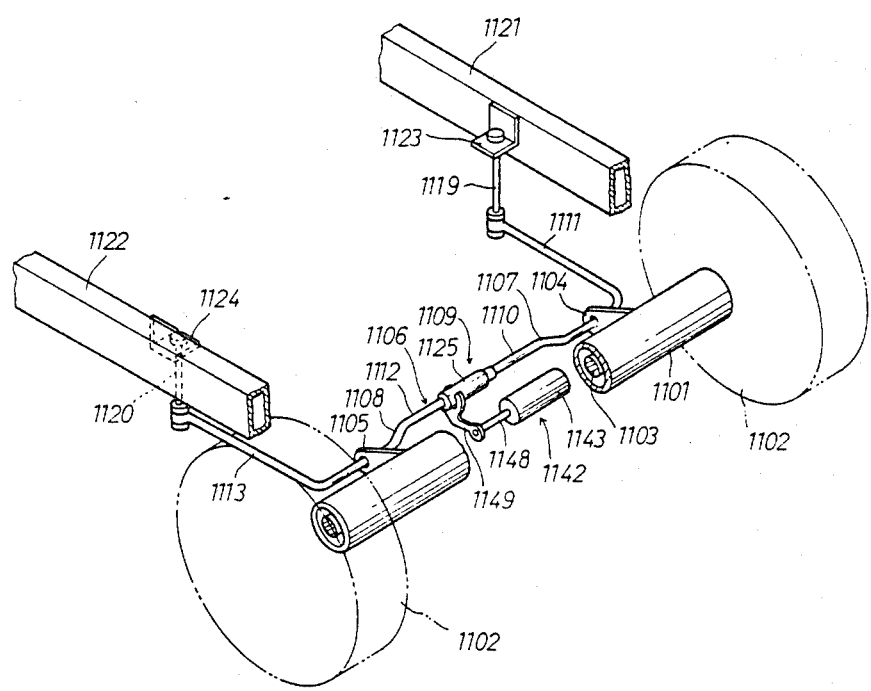
FIG. 14A is a perspective view illustrative of a condition wherein a stabilizer as the third example is utilized.
Figure 14B:
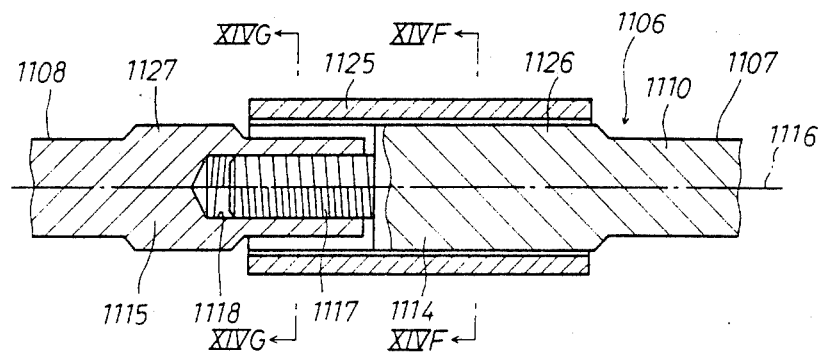
FIGS. 14B and 14C are partially enlarged vertical sectional views of the third example.
Figure 14C:
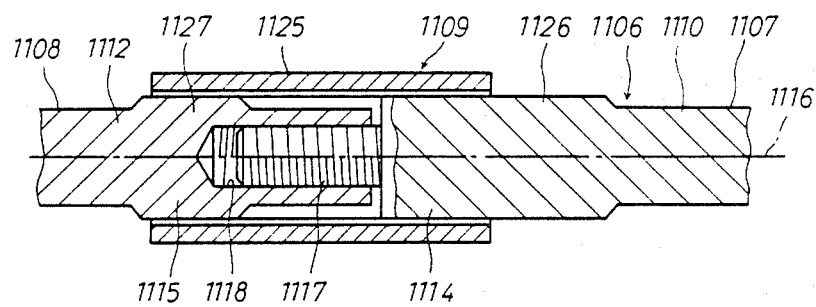
Figure 14D:
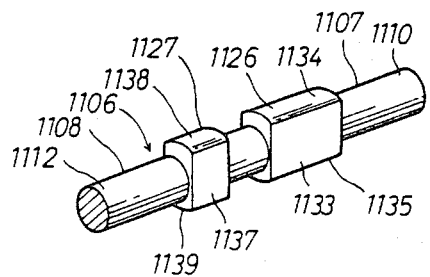
Figure 14E:
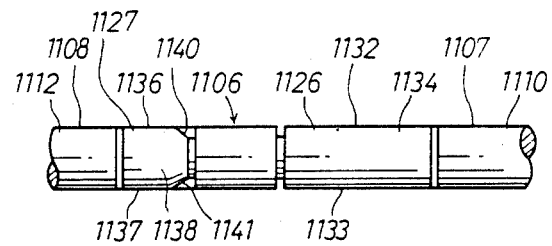
FIG. 14E is a plan view of FIG. 14D.
Figure 14F:
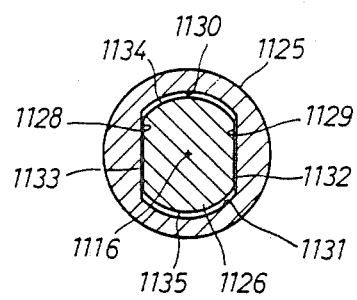
FIG. 14F is a sectional view taken along line of XIVF—XIVF shown in FIG. 14B.
Figure 14G:
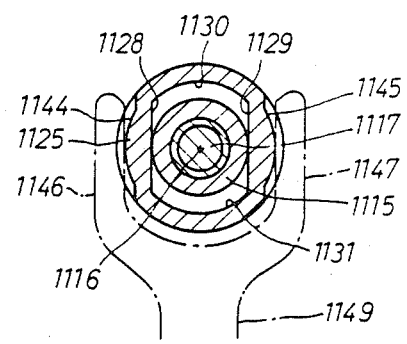
FIG. 14G is a sectional view taken along line of XIVG—XIVG shown in FIG. 14B.

FIG. 14A shows an exploded perspective view of a torsion-bar-type stabilizer built in an axle-type suspension of an automobile. FIGS. 14B and 14C respectively show enlarged partial sectional views of the main part of the stabilizer of FIG. 14A in the coupled and uncoupled states. FIG. 14D shows a perspective view of the main part shown in FIGS. 14B and 14C, omitting the clutch. FIG. 14E shows a plan view of the main part shown in FIG. 14D. FIG. 14F shows a cross-sectional view taken on line XIVF—XIVF of FIG. 14B. FIG. 14G shows a cross-sectional view taken on line XIVG—XIVG of FIG. 14B.

In the drawings, an axle 1103 coupled with wheels 1102 is rotatably supported by an axle housing 1101. A pair of brackets 1104 and 1105 is secured on the axle housing 1101 in positions separated from each other in the direction of the width of the body. A torsion-bar-type stabilizer 1106 is coupled to the axle housing 1101 by means of bushes (not shown) by the brackets 1104 and 1105.

The stabilizer 1106 includes a right portion 1107 and a left portion 1108 which can be selectively coupled to each other by a coupling unit 1109. A protrusion 1117 and a hole 1118, which extend along an axis 1116, are respectively formed at the ends 1114 and 1115 of rods 1110 and 1112 opposite the arms 1111 and 1113, as shown in FIG. 14B. The protrusion 1117 and the hole 1118 are respectively constructed as a male screw and a female screw which are engaged with each other so as to couple the rods 1110 and 1112 rotatably relative to each other around the axis 1116. The tips of the arms 1111 and 1113 are coupled to brackets 1123 and 1124, secured on side frames 1121 and 1122 of the vehicle by links 1119 and 1120. As shown in FIG. 14C, the coupling unit 1109 includes a cylindrical clutch 1125, a clutch guide 1126 and a clutch bearer 1127. The clutch guide 1126 is provided at one end 1114 of the rod 1110 and supports the clutch 1125 non-rotatably around the axis 1116 but permitting movement back and forth along the axis. The clutch bearer 1127 is provided at the end 1115 of the rod 1112 and bears the clutch 1125 non-rotatably around the axis 1116. The inside circumferential surface of the clutch 1125 includes planes 1128 and 1129 facing each other relative to the axis 1116 and extending in parallel with each other along the axis, and partially cylindrical surfaces 1130 and 1131 adjoining the planes in position opposed to each other relative to the axis 1116, as shown in FIG. 14F. Corresponding to the inside circumferential surface of the clutch 1125, the peripheral surface of the clutch guide 1126 includes planes 1132 and 1133 facing each other relative to the axis 1116 and extending in parallel with each other along the axis, and partially cylindrical surfaces 1134 and 1135 adjoining the planes in positions opposed to each other relative to the axis 1116. The peripheral surface of the clutch bearer 1127 includes planes 1136 and 1137 facing each other relative to the axis 1116 and extending in parallel with each other along the axis, and partially cylindrical surfaces 1138 and 1139 adjoining the planes in positions opposed to each other relative to the axis 1116, as shown in FIG. 14D or FIG. 14E.

The planes 1132 and 1133 of the clutch guide 1126 are continuously engaged with those 1128 and 1129 of the clutch 1125 as shown in FIG. 14F. When the clutch 1125 is in a position shown in FIG. 14C, planes 1136 and 1137 of the clutch bearer 1127 are also engaged with those 1128 and 1129 so that the right portion 1107 and the left portion 1108 of the stabilizer are integrally coupled to each other so as not to rotate along the axis 1116. As shown in FIG. 14E, the ends 1140 and 1141 of the planes 1136 and 1137 of the clutch bearer 1127 at the right portion 1107 of the stabilizer are chamfered. Even if the rods 1110 and 1112 are slightly rotated to each other around the axis 1116, the clutch 1125 can be moved from a position shown in FIG. 14B to a position shown in FIG. 14C. The right portion 1107 of the stabilizer is thus integrally coupled to the left portion 1108 thereof as the arms 1111 and 1113 of the portions are on the same plane.

The clutch 1125 is moved back and forth along the axis 1116 by an actuator 1142 controlled by the ECU 4. The actuator 1142 shown in FIG. 14A includes a hydraulic pistoncylinder unit 1143 secured on a differential casing (not shown), and a shifting fork 1149. The fork 1149 has arms 1146 and 1147 engaged in grooves 1144 and 1145 of the peripheral surface of the clutch 1125, as shown in FIG. 14G, and is coupled to the piston rod 1148 of the piston-cylinder unit 1143 shown in FIG. 14A.

When the clutch 1125 is placed in a position shown in FIG. 14C by the actuator 1142 according to an instruction from the ECU 4, the right portion 1107 and left portion 1108 of the stabilizer 1106 are integrally coupled to each other to reduce the rolling of the vehicle, thus improving its controllability and stability. On the other hand, when the clutch 1125 is placed in a position shown in FIG. 14B by the actuator 1142, the right portion 1107 and left portion 1108 of the stabilizer 1106 can be rotated relative to each other around the axis 1116 to reduce the shock to the vehicle, and more particularly to reduce the shock to the wheels of only one side of the vehicle, thus improving the riding comfort of the vehicle.

Figure 15A:
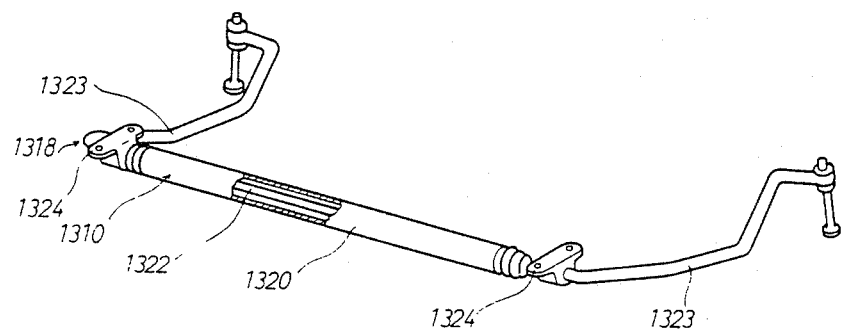
FIG. 15A is a perspective view of another stabilizer as the fourth example.
Figure 15B:
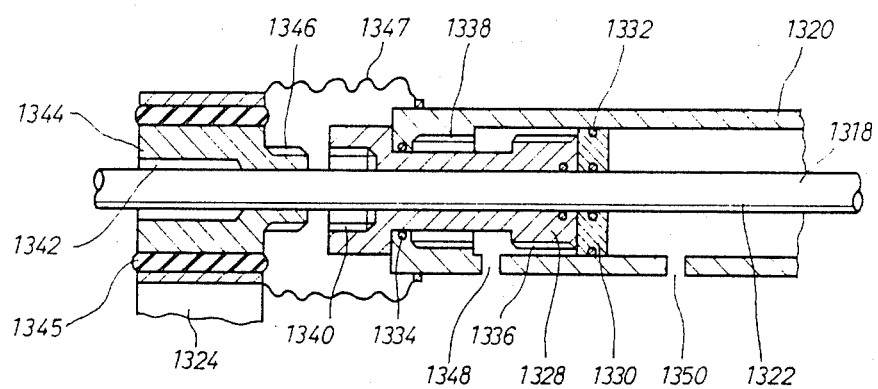
FIG. 15B is a partially enlarged vertical sectional view of FIG. 15A.

FIGS. 15A and 15B show another stabilizer as the fourth example.

A stabilizer-bar-type assembly 1310 includes a first stabilzer bar 1318 and a second stabilizer bar 1320, as shown in FIG. 15A. The first stabilizer bar 1318 includes a main portion 1322 and an arm 1323. The main portion 1322 is attached to the body of a vehicle by a pair of fitting metals 1324 so that the main portion 1322 can be twisted around its axis.

The second stabilizer bar 1320 is hollow so that the main portion 1322 of the first stabilizer bar 1318 extends through the second stabilizer bar, as shown in FIG. 15B. The second stabilizer bar 1320 is disposed inside the pair of fitting metals 1324 so that the first stabilizer bar 1318 can be connected to and disconnected from the second stabilizer. A piston 1330, on which a spool 1328 is secured, is slidably fixed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilzer bar 1320 has, at one end, splines 1338 which can be engaged with the splines 1336. The spool 1328 has other splines 1340 inside the outwardly projecting end thereof.

A coupler 1344 is connected to the main portion 1322 of the first stabilizer bar 1318 by splines 1342. The coupler 1344 has splines 1346 engageable with the splines 1340, which extend from the spool 1328 and which are opposed thereto. The coupler 1344 is connected to the fitting metals 1324 by means of a rubber bush 1345, as shown in FIG. 15B, so that the main portion 1322 of the first stabilizer bar 1318 is twisted by deforming the bush 1345. The coupler 1344 is fitted in such a position that the splines 1340 are engaged with the splines 1346 when the spool 1328 is moved leftward in the drawing, and the splines 1336 are engaged with the splines 1338. A bellowslike boot 1347 for protecting the splines 1340 and 1346 from dust is provided between the coupler 1344 and the second stabilizer bar 1320.

Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 via an actuator such as a pressure control valve, the piston 1330 is moved leftward in the drawing, together with the spool 1328. The splines 1336 are engaged with the splines 1338, and the splines 1340 with the splines 1346. As a result, the first and second stabilizer bars 1318 and 1320 are coupled to each other so as to raise the stiffness of the stabilizer bar assembly. On the contrary, when the pressure fluid is led to the other port 1348, the piston 1330 is moved rightward in the drawing, thus the spines are disengaged from each other. As a result, the stiffness of the stabilizer bar assembly is reduced.

Figure 16A:
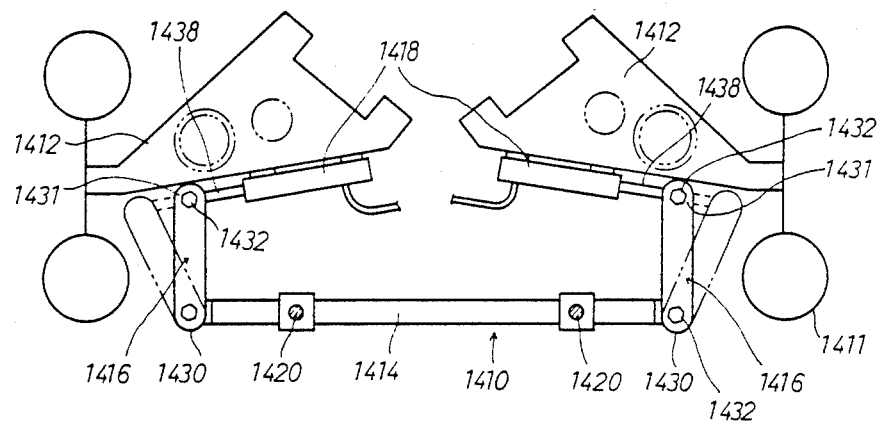
FIG. 16A is a diagrammatic plan view of still another stabilizer as the fifth example.
Figure 16B:
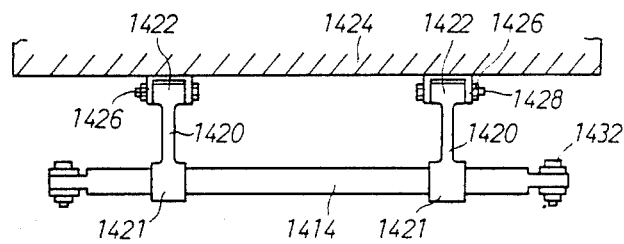
FIG. 16B is a view partially illustrative of FIG. 16A.
Figure 16C:
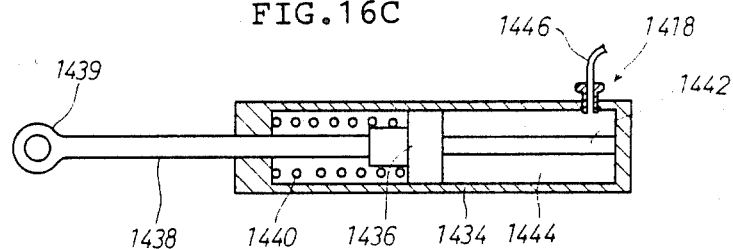
FIG. 16C is a sectional view of an extending part.

FIGS. 16A, 16B and 16C show three different views of still another stabilizer as the fifth example.

FIG. 16A shows a schematic plan view of a stabilizer 1410. In the drawing, numeral 1411 denotes wheels and numeral 1412 denotes suspension arms. The stabilizer 1410 includes a main part 1414, a pair of arms 1416 and extending parts 1418. The main part 1414 in the form of a round bar is laid through bearing portions 1421 of a pair of links 1420 disposed at certain distances apart from each other in the direction of the width of the body 1424 of a vehicle, and is supported by the bearing portions 1421 so that the main part 1414 can be twisted around its axis. The other bearing portions 1422 at the upper ends of the links 1420 are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first ends 1430 of the arms 1416 are coupled to the ends of the main part 1414 by bolts and nuts 1432 so that the arms can be rotated around vertical axes. The second ends 1431 of the arms 1416 are located at certain distances away from the first ends 1430 to the front-to-rear direction of the vehicle body 1424. The front-to-rear direction is an oblique longitudinal direction.

The second ends 1431 of the arms 1416 are displaced in the direction of the width of the vehicle body 1424 by the extending parts 1418 which may be power cylinders. Each of the power cylinders shown in FIG. 16C includes a cylinder 1434, a piston 1436 liquid-tightly and slidably fitted in the cylinder 1434, a piston rod 1438, which is coupled at one end to the piston 1436 and which projects at the other end out of the cylinder 1434, and a compressed spring 1440 for displacing the piston 1436 in such a direction as to contract the piston rod 1438. A stopper 1442 secured on the piston 1436 prevents the piston from being displaced more than a predetermined distance.

The cylinder 1434 is secured on the suspension arm 1412 in such a manner that the piston rod 1438 is located outside the cylinder 1434 in the direction of the width of the vehicle body. The second end 1431 of the arm 1416 is coupled to the outwardly projecting end 1439 of the piston rod 1438 by the bolts and nuts 1432 so that the arm 1416 can be rotated around the vertical axis.

One end of a flexible hose 1446 is connected to a liquid chamber 1444 of the cylinder 1434 opposite the side on which the compressed spring 1440 is located. The other end of the flexible hose 1446 is connected to a pressure source (not shown) through an actuator such as a pressure control valve. Unless pressure is applied to the liquid chambers 1444 of the power cylinders according to the state of the actuator instructed by the ECU 4, the second ends 1431 of the arms 1416 are located in relatively inner positions as shown in FIG. 16A, so that the anit-roll rate of the stabilizer is low.

On the contrary, when the actuator is operated by the ECU 4 to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as indicated by imaginary lines, i.e., double dotted chain lines, in FIG. 16A, to increase the arm ratio of the stabilizer to raise its stiffness against the rolling of the vehicle.

Figure 17A:
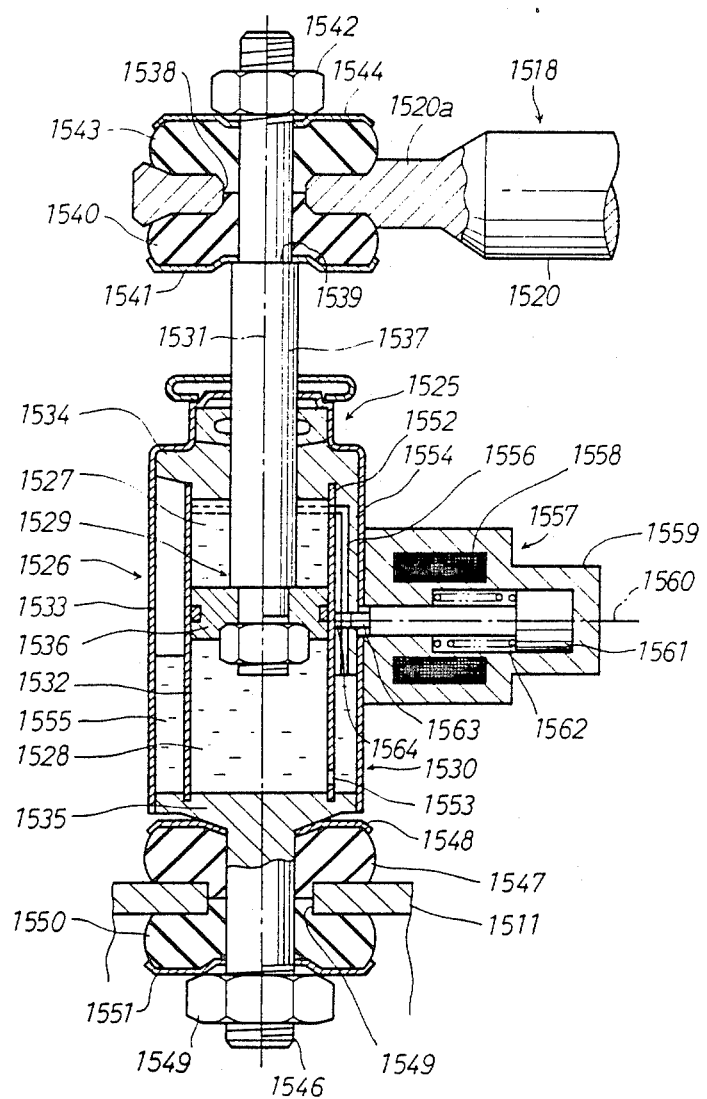
FIG. 17A is a partial front view illustrative of a stabilizer joint as the sixth example.
Figure 17B:
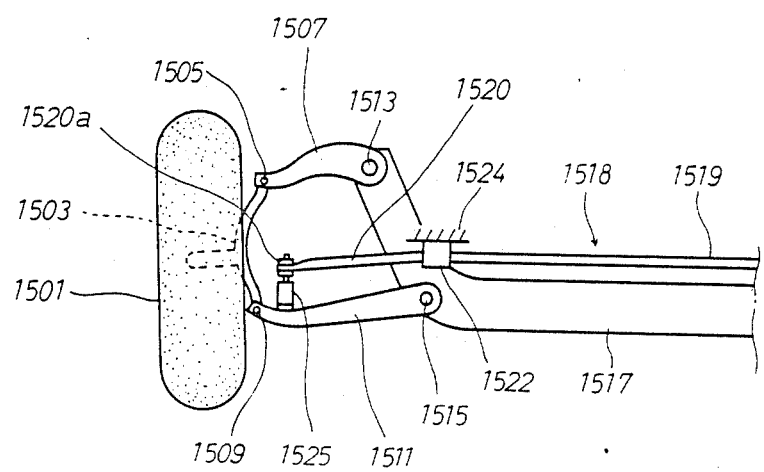

FIGS. 17A and 17B show a construction of a coupling unit for a stabilizer and a lower control arm, as the sixth example.

FIG. 17A shows a partial front view of a wishbone-type suspension including a coupling unit for a stabilizer of a vehicle. FIG. 17B shows an enlarged sectional view of the coupling unit shown in FIG. 17A. In the drawings, a wheel 1501 is rotatably supported by a knuckle 1503. The knuckle 1503 is pivotally coupled at the upper end to one end of an upper control arm 1507 by means of a pivot 1505, and is pivotally coupled at the lower end to one end of a lower control arm 1511 by means of a pivot 1509. The upper control arm 1507 and the lower control arm 1511 are pivotally coupled to a cross member 1517 of the vehicle by pivots 1513 and 1515. A stabilizer 1518, which is shaped as a U, is disposed along the width of the vehicle as shown in FIG. 17A. The stabilizer 1518 is coupled at its central rod 1519 to the body 1524 of the vehicle by brackets 1522 by means of rubber bushes (not shown), so that the stabilizer can be rotated around its axis. The tip 1520a of an arm 1520 of the stabilizer 1518 is coupled to one portion near one end of the lower control arm 1511 by a coupling unit 1525. FIG. 17B shows the coupling unit 1525 including a piston-cylinder assembly 1526. The piston-cylinder assembly 1526 includes a piston 1529 and a cylinder 1530 which cooperate with each other to define two cylinder chambers 1527 and 1528. The cylinder 1530 includes an inner cylinder 1532 which supports the piston 1529 for movement back and forth along an axis 1531, an outer cylinder 1533 disposed concentrically to the inner cylinder 1532, and end caps 1534 and 1535 which close both the ends of the inner cylinder and the outer cylinder. The piston 1529 includes a main portion 1536 and a piston rod 1537, which bears the main portion 1536 at one end thereof and which extends along the axis 1531 through the end cap 1534 and the hole 1538 of the tip 1520a of the arm 1520 of the stabilizer 1518.

A rubber bush 1540 and a retainer 1541 for holding the bush are interposed between a shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is disposed with through holes 1552 and 1553 near the end caps 1534 and 1535. The end cap 1534 is integrally provided with a projection 1554 which extends along the axis 1531 between the inner cylinder 1532 and the outer cylinder 1533 and is located in tight contact with the inner and outer cylinders. The projection 1554 has an internal passage 1556 which is coincident at one end with the through hole 1552 and is open at the other end into an annular space 1555 between the inner cylinder 1532 and the outer cylinder 1533. As a result, the through hole 1552, the internal passage 1556, the annular space 1555 and the other through hole 1553 define a passage means for connecting both the cylinder chambers 1527 and 1528 to each other. A part of the annular space 1555 is filled with air. The cylinder chambers 1527 and 1528, the internal passage 1556 and the remaining part of the annular space 1555 are filled with oil. The change in the volume of the piston rod 1537 in the cylinder 1530, which is caused by the displacement of the piston 1529 from the cylinder 1530, is compensated by compression or expansion of the air filled in the part of the annular space 1555.

The connection of the internal passage 1556 is selectively controlled by a normally-opened solenoid valve 1557. The solenoid valve 1557 includes a core 1561, a compressed helical spring 1562 and a housing 1559 with a solenoid 1558. The housing 1559 is secured at one end on the outer cylinder 1533. The core 1561 is supported in the housing 1559 for movement back and forth along an axis 1560. The compressed helical spring 1562 presses the core 1561 rightward in FIG. 17B. A valve element 1563 is integrally formed as one piece at one end of the core 1561 to be selectively fitted into a hole 1564 extending to penetrate the internal passage 1556 of the projection 1554 in the horizontal direction.

When no electricity is applied to the solenoid 1558 according to an instruction form the ECU 4, the core 1561 is pressed rightward in the drawing by the compressed helical spring 1562 so as to open the valve 1557 to connect the internal passage 1556. On the contrary, when electricity is applied to the solenoid 1558 according to an instruction from the ECU 4, the core 1561 is driven leftward in the drawing against the force of the compressed helical spring 1562 so as to fit the valve element 1563 into the hole 1564 to isolate the internal passage 1556.

In the coupling unit constructed as above, when electricity is applied to the solenoid 1558 of the solenoid valve 1557, the solenoid valve 1557 is closed so as to disconnect the cylinder chambers 1527 and 1528 from each other. Thus, oil in one cylinder chamber is kept from flowing to the other cylinder chamber, so that the piston 1529 is hindered form moving relative to the cylinder 1530 along the axis 1531. As a result, the stabilizer 1518 works for suppressing the rolling of the vehicle so as to keep good control and high stability of the vehicle even when one of the wheels rides over a bump or through a dip in a road surface.

On the other hand, when no electricity is applied to the solenoid 1558, the solenoid valve 1557 is maintained in an open position shown in FIG. 17B, so that oil in both the cylinder chambers 1527 and 1528 can freely flow to each other via the internal passage 1556 and so forth. As a result, the piston 1529 can be smoothly moved in the cylinder 1530 so that the tips of both the right and left arms 1520 can be smoothly moved around the corresponding lower control arms 1511. Since the stabilizer does not work this time, the damping force for rear wheels of the vehicle is reduced to keep good riding comfort.

Although the invention has been described with reference to specific embodiments thereof, it will be apparent that numerous changes and modifications may be made therein without departing from the scope of the invention. It is, therefore, to be understood that it is not intended to limit the invention to the embodiment shown but only by the scope of the claims which follow.

What is claimed is:

1. A suspension controller of a vehicle comprising:
   vehicle height detection means for detecting a vehicle height at a front wheel and for generating a vehicle height signal according to the distance;
   conversion means for converting the vehicle height signal into a corresponding converted height signal, wherein the converted height signal increases more sharply than the vehicle height signal when the vehicle height signal is greater than a preset value and decreases sharply when the vehicle height signal is less than another preset value;
   control means for generating a suspension characteristic alteration signal depending on the converted height signal; and
   suspension characteristic alteration means for altering characteristics of suspensioning of the vehicle in response to the suspension characteristic alteration signal.

2. A suspension controller according to claim 1, wherein the converted height signal is the same as the vehicle height signal when the vehicle height signal is within a predetermined range including an average value thereof.

3. A suspension controller according to claim 1, wherein the suspension controller further comprises vehicle height adjusting means for setting the average vehicle height at a certain level and wherein the conversion means converts the vehicle height signal only when the set average height is out or a predetermined range.

4. A suspension controller according to claim 1, wherein the control means generates the suspension characteristic alteration signal when a difference of the maximum and the minimum values among a predetermined munber of converted height signals corresponding to consecutively detected vehicle height signals is greater than a reference value.

5. A suspension controller according to claim 1, wherein the conversion means comprises a conversion table stored in a memory and determines a converted height signal corresponding to each vehicle height signal according to the table.

6. A suspension controller according to claim 3, wherein the conversion means comprises first and second conversion tables stored in a memory, the first table being so made that the converted height signal increases and decreases more sharply than the vehicle height signal and the second table being so made that the converted height signal is the same as the vehicle height signal, and wherein the conversion means uses the first conversion table when the set average height is within the predetermined range and the second conversion table when the set average height is out of the predetermined range.

7. A suspension controller according to claim 1, wherein the suspension characteristic alteration means increases the spring rate of the suspensions of the vehicle in response to the suspension characteristic alteration signal.

8. A suspension controller according to claim 1, wherein the suspension characteristic alteration means increases the damping force of shock absorbers of the vehicle in response to the suspension characteristic alteration signal.

9. A suspension controller according to claim 1, wherein the suspension characteristic alteration means increases the resiliency of a stabilizer fo the vehicle in response to the suspension characteristic alteration signal.

10. A suspension controller according to claim 1, wherein the suspension charcteristic alteration means increases the stiffness of rubber bushes provided at joints of suspension arms in response to the suspension characteristic alteration signal.

* * * * *